US009391686B2

(12) United States Patent
Ikeda et al.

(10) Patent No.: US 9,391,686 B2
(45) Date of Patent: Jul. 12, 2016

(54) WIRELESS COMMUNICATION SYSTEM AND DATA TRANSMITTER

(71) Applicant: Renesas Electronics Corporation, Tokyo (JP)

(72) Inventors: Hidetoshi Ikeda, Tokyo (JP); Masayuki Mizuno, Tokyo (JP); Haruya Ishizaki, Tokyo (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 15/000,991

(22) Filed: Jan. 19, 2016

(65) Prior Publication Data
US 2016/0134350 A1 May 12, 2016

Related U.S. Application Data

(62) Division of application No. 14/453,503, filed on Aug. 6, 2014, now Pat. No. 9,287,968.

(30) Foreign Application Priority Data

Aug. 26, 2013 (JP) ................................. 2013-174430
May 16, 2014 (JP) ................................. 2014-102457

(51) Int. Cl.
*H04B 1/38* (2015.01)
*H04B 7/06* (2006.01)
*H04B 15/00* (2006.01)

(52) U.S. Cl.
CPC .............. *H04B 7/0619* (2013.01); *H04B 15/00* (2013.01)

(58) Field of Classification Search
USPC .............................................. 455/572, 127.1
See application file for complete search history.

(56) References Cited

U.S. PATENT DOCUMENTS 6,307,879 B1 * 10/2001 Moriyama ............... H04B 1/40
375/219
2008/0261519 A1 * 10/2008 DeMarco ............... H04B 1/525
455/7

(Continued)

FOREIGN PATENT DOCUMENTS

JP 2012-84111 A 4/2012
JP 2013-55611 A 3/2013

OTHER PUBLICATIONS

Notice of Allowance in U.S. Appl. No. 14/453,503 dated Dec. 1, 2015.

(Continued)

*Primary Examiner* — Fayyaz Alam
(74) *Attorney, Agent, or Firm* — McGinn IP Law Group, PLLC

(57) ABSTRACT

A wireless communication system includes a first radio equipment that transmits first data using a first radio wave; a data transmitter that transmits a second radio wave, the second radio wave causing a disturbance on the first radio wave according to second data to be transmitted; and a second radio equipment that demodulates the first data transmitted from the first radio equipment, and demodulates the second data transmitted from the data transmitter using a variation in a bit error rate of communication between the first radio equipment and the second radio equipment, wherein the data transmitter includes a first antenna that receives the first radio wave; an input amplifier that amplifies a signal corresponding to the first radio wave received by the first antenna; and an oscillator that is supplied with an output from the input amplifier, and oscillates at the same frequency as that of the first radio wave.

6 Claims, 31 Drawing Sheets

(56) References Cited

U.S. PATENT DOCUMENTS

| | | | |
|---|---|---|---|
| 2012/0062369 A1* | 3/2012 | Ishizaki | G06K 7/0008 340/10.4 |
| 2013/0058263 A1 | 3/2013 | Ishizaki et al. | |
| 2015/0270721 A1* | 9/2015 | Lin | H02M 7/06 307/104 |

OTHER PUBLICATIONS

Extended European Search Report dated Apr. 21, 2015.
Extended European Search Report dated Feb. 27, 2015.

* cited by examiner

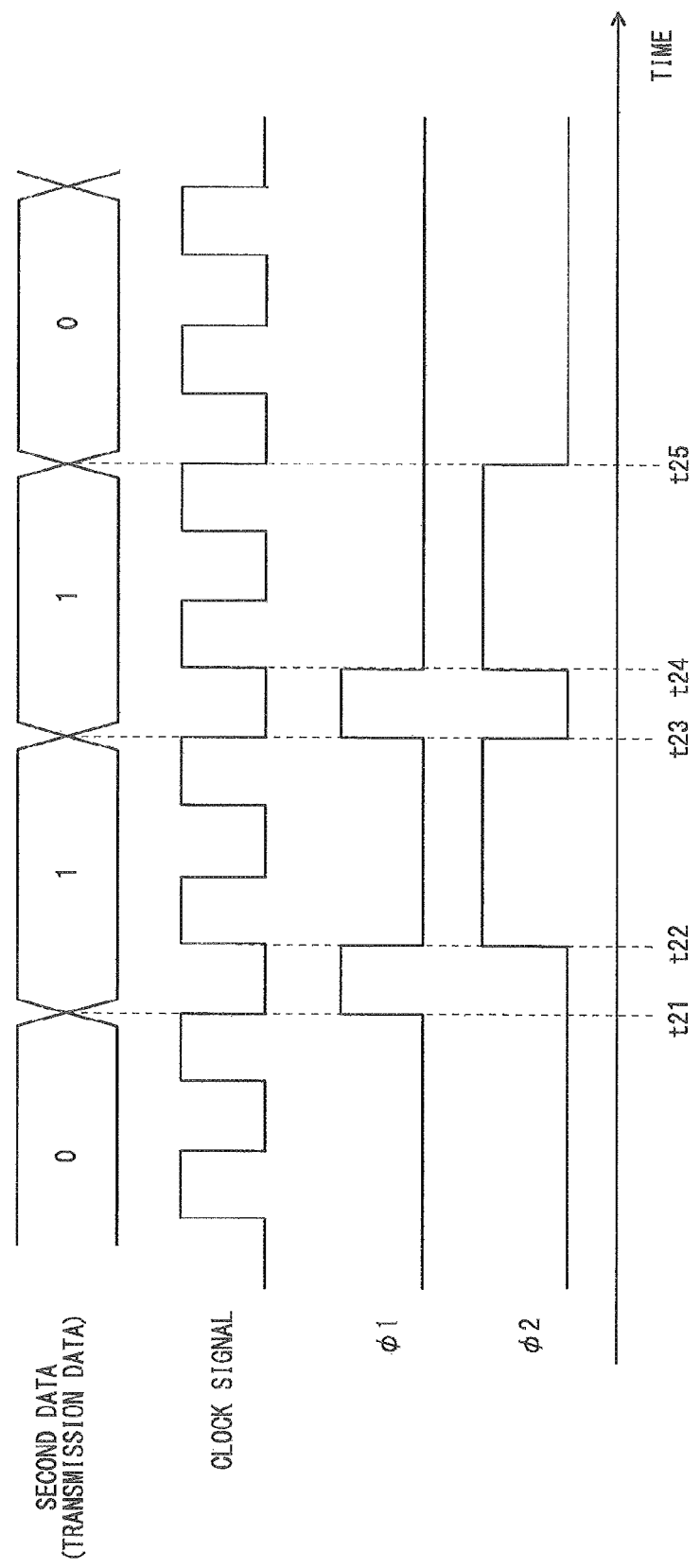

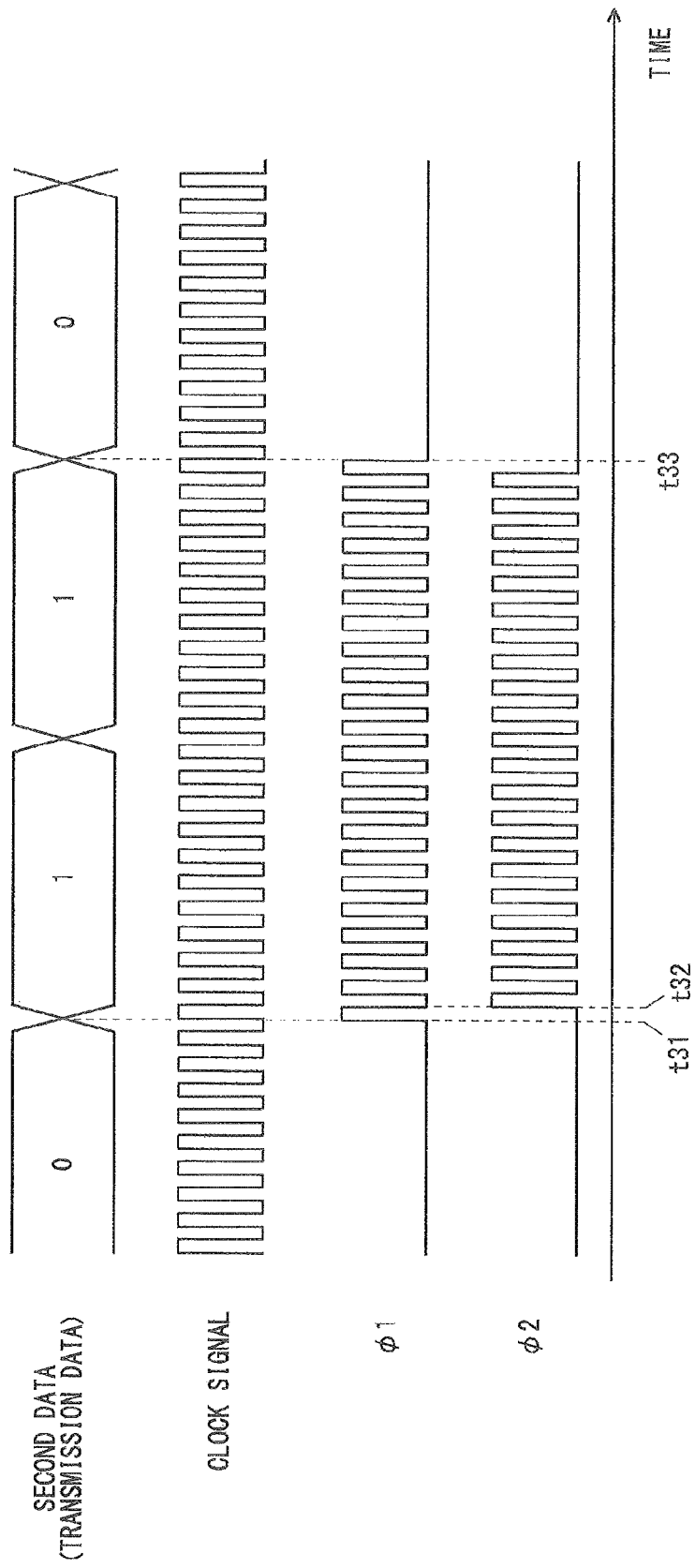

WIRELESS COMMUNICATION SYSTEM AND DATA TRANSMITTER

CROSS-REFERENCE TO RELATED APPLICATIONS

The present application is a Divisional Application of U.S. patent application Ser. No. 14/453,503, filed on Aug. 6, 2014, which is based on Japanese Patent Application Nos. 2013-174430 filed on Aug. 26, 2013, and 2014-102457, filed on May 16, 2014, the contents of which is incorporated herein by reference in its entirety.

BACKGROUND

The present invention relates to a wireless communication system and a data transmitter, and relates to, for example, a wireless communication system and a data transmitter that can introduce a system using RFID (Radio Frequency IDentification) technology into the wireless network environment.

A system using RFID attracts attention and has begun to be applied to various uses. The basic configuration of the system using RFID includes an RFID reader/writer that performs data communication with an RFID radio tag via radio and a computer terminal that controls the RFID reader/writer. The RFID reader/writer can read or write data stored in the radio tag.

Japanese Unexamined Patent Application Publication Nos. 2012-84111 and 2013-55611 disclose a technique related to a wireless communication system capable of reducing the cost for introducing a system utilizing RFID technology into a wireless network environment

SUMMARY

In a wireless communication system utilizing the RFID technology, data is transmitted to a predetermined radio equipment from an RFID radio tag (a data transmitter). The data transmitter here is, for example, a sensor node, and distributed and disposed in order to obtain predetermined information. Therefore, when a frequency of battery exchange in a data transmitter increases, convenience of the wireless communication system deteriorates. Accordingly, in order to reduce the frequency of battery exchange in the sensor node, it has been necessary to reduce the power consumption of the data transmitter. Meanwhile, in order to increase transmission power of the data transmitter, it is necessary to increase a gain of an amplifier mounted on the data transmitter. However, the present inventor has found a problem that when the gain of the amplifier is increased, the power consumption of the data transmitter increases.

Other issues and new features will be apparent from the description and attached drawings of the specification of the present invention.

According to an aspect of the present invention, a wireless communication system includes: a first radio equipment that transmits first data using a first radio wave; a data transmitter that transmits second data using a second radio wave; and a second radio equipment that modulates the first data and the second data. The second radio equipment demodulates the second data transmitted from the data transmitter using a variation in a bit error rate of communication between the first radio equipment and the second radio equipment. The data transmitter includes: an amplifier that amplifies a signal corresponding to the first radio wave received by the first antenna; and a feedback element that feedbacks a signal from an output node of the amplifier to an input node of the amplifier, and forms a feedback loop.

According to another aspect of the present invention, a wireless communication system includes: a first radio equipment that transmits first data using a first radio wave; a data transmitter that transmits second data using a second radio wave; and a second radio equipment that demodulates the first data and the second data. The second radio equipment demodulates the second data transmitted from the data transmitter using a variation in a bit error rate of communication between the first radio equipment and the second radio equipment. The data transmitter includes: an input amplifier that amplifies a signal corresponding to the first radio wave received by the first antenna; an oscillator that is supplied with an output from the input amplifier, and oscillates at the same frequency as that of the first radio wave; and an output amplifier that amplifies a signal output from the oscillator.

According to another aspect of the present invention, a data transmitter includes: an amplifier that amplifies a signal corresponding to a first radio wave received by a first antenna; and a feedback element that feedbacks a signal from an output node of the amplifier to an input node of the amplifier, and forms a feedback loop.

According to another aspect of the present invention, a data transmitter includes: an antenna that receives a first radio wave, and transmits a second radio wave; an input amplifier that amplifies a signal corresponding to the first radio wave received by the antenna; an output amplifier that amplifies a signal output from an oscillator; and an input/output switching circuit that switches between a connection that is between an input node of the input amplifier and the antenna and a connection that is between an output node of the output amplifier and the antenna; and a control circuit that controls the input/output switching circuit. When the second data is transmitted, the control circuit connects the input node of the input amplifier to the antenna, and after a frequency of an output signal from the oscillator matches a frequency of an output signal from the input amplifier, the control circuit connects the output node of the output amplifier to the antenna.

According to the above-mentioned aspects, it is possible to provide the wireless communication system and the data transmitter that are capable of increasing transmission power of the data transmitter while reducing power consumption of the data transmitter.

BRIEF DESCRIPTION OF THE DRAWINGS

The above and other aspects, advantages and features will be more apparent from the following description of certain embodiments taken in conjunction with the accompanying drawings, in which:

FIG. 34 is a timing chart for explaining an operation of the data transmitter used in the wireless communication system according to the tenth embodiment; and FIG. 35 is a timing chart for explaining the operation of the data transmitter used in the wireless communication system according to the tenth embodiment.

DETAILED DESCRIPTION

First Embodiment

Figure 1:
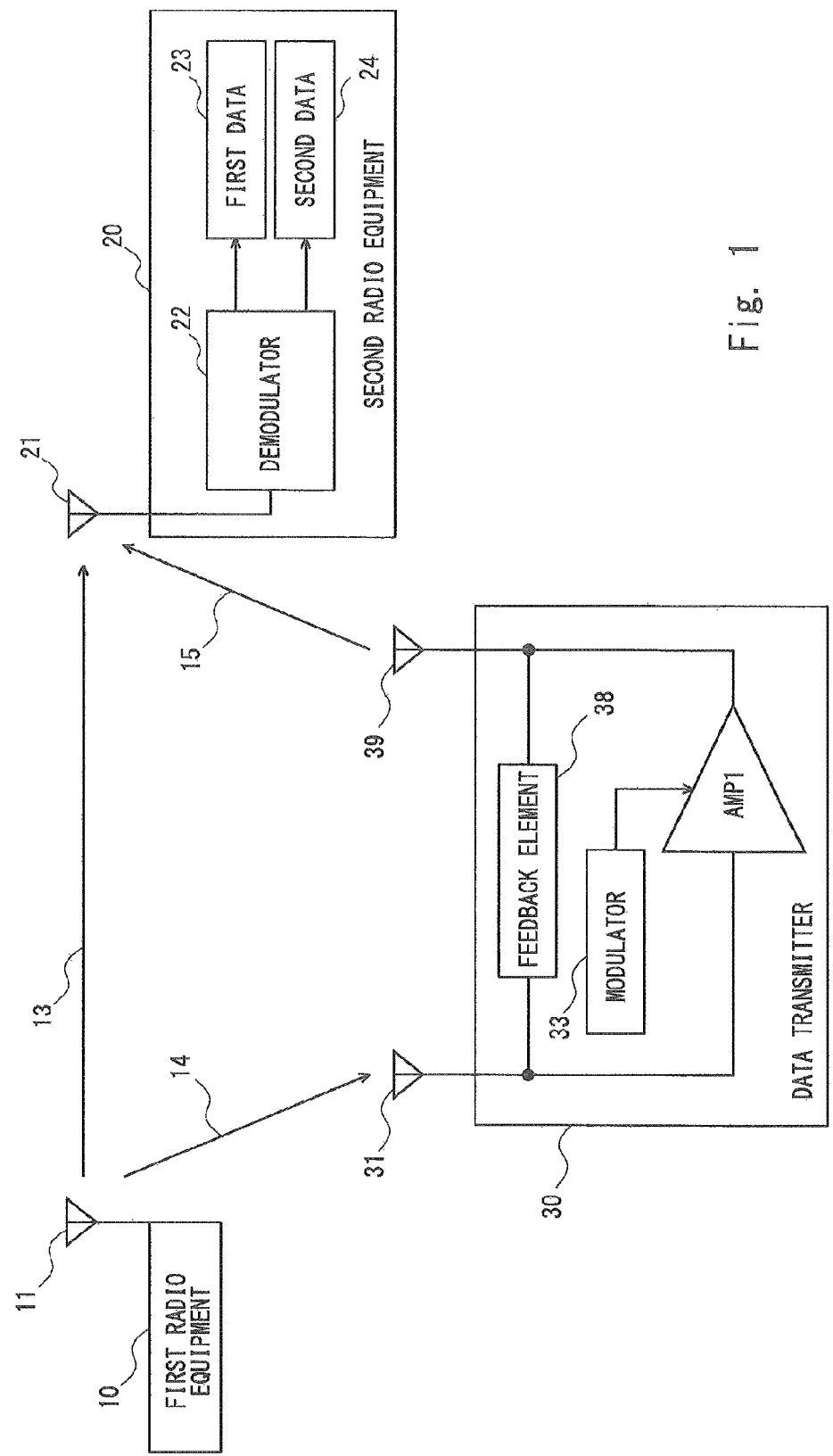
FIG. 1 is a block diagram showing a wireless communication system according to a first embodiment.

Hereinafter, a first embodiment shall be explained with reference to the drawings. FIG. 1 is a block diagram showing a wireless communication system according to a first embodiment. As shown in FIG. 1, the wireless communication system according to this embodiment includes a first radio equipment 10, a second radio equipment 20, and a data transmitter 30 (which corresponds to an RFID radio tag). The first radio equipment 10 transmits first data using first radio waves 13 and 14. The data transmitter 30 transmits a second radio wave 15 for causing a disturbance on the first radio wave 13 according to second data to be transmitted. The second radio equipment 20 receives the first radio wave 13 that is transmitted from the first radio equipment 10 and the second radio wave 15 that is transmitted from the data transmitter. Then, a demodulator 22 of the second radio equipment 20 demodulates first data 23 that is transmitted from the first radio equipment 10, and also demodulates second data 24 that is transmitted from the data transmitter 30 using a variation in a bit error rate of communication between the first radio equipment and the second radio equipment.

The data transmitter 30 includes at least a first antenna 31, an amplifier AMP1, a feedback element 38, a modulator 33, and a second antenna 39. The first antenna 31 receives the first radio wave 14 that is transmitted from the first radio equipment 10. The amplifier AMP1 amplifies a signal corresponding to the first radio wave 14 that is received by the first antenna 31. The feedback element 38 feedbacks a signal from an output node of the amplifier AMP1 to an input node of the amplifier AMP1 (positive feedback), and forms a feedback loop. The modulator 33 modulates the signal in the feedback loop according to the second data. For example, the modulator 33 turns on and off power supplied to the amplifier AMP1 so as to modulate the signal in the feedback loop. The second antenna 39 transmits the modulated signal using the second radio wave 15.

As described above, in the wireless communication system according to this embodiment, the bit error rate of communication between the first radio equipment 10 and the second radio equipment 20 is changed using the second radio wave 15 that is transmitted from the data transmitter 30 such as an RFID to thereby transmit the second data from the data transmitter 30 to the second radio equipment 20. Further, in the data transmitter 30 included in the wireless communication system according to this embodiment, the feedback element 38 is provided to feedback a signal from the output node of the amplifier AMP1 to the input node of the amplifier AMP1. When the feedback loop is formed in this way, the amplifier AMP1 oscillates, thereby reducing the power consumption of the data transmitter 30 while improving a gain of the amplifier AMP1. Hereinafter, each element of the wireless communication system according to this embodiment is described in detail.

The first radio equipment 10 includes an internal circuit (not shown in the drawings) for achieving radio communication with the second radio equipment 20 and an antenna 11, and transmits the first data using the first radio waves 13 and 14. The first radio wave 13 is a direct wave that is directly transmitted to the second radio equipment 20. Further, the first radio wave 14 is a radio wave received by the data transmitter 30.

The second radio equipment 20 includes an internal circuit (not shown in the drawings) for achieving wireless communication with the first wireless device 10, and an antenna 21. Further, the demodulator 22 included in the second radio equipment 20 demodulates the first data 23 included in the received first radio wave 13 and the second data 24 included in the second radio wave 15.

The first radio equipment 10 and the second radio equipment 20 constitute a wireless local area network (WLAN). For example, the first radio equipment 10 is a WLAN base station (a WLAN access point), and the second radio equipment 20 is a WLAN receiver (a WLAN client). Moreover, for example, the first radio equipment 10 and the second radio equipment 20 are configured to be able to perform two-way communication. Note that, in this embodiment, normal data communication between the first radio equipment 10 and the second radio equipment 20 is performed by using the internal circuits respectively included in the first radio equipment 10 and the second radio equipment 20. The normal data communication between the first radio equipment 1 and the second radio equipment 2 is performed in the same manner as in related art, and thus not described in detail here.

In addition, the wireless communication system according to this embodiment is not limited to WLAN, and can be widely applied to devices in compliance with the existing radio standards such as Bluetooth (registered trademark) and mobile phones other than WLAN.

Figure 2:
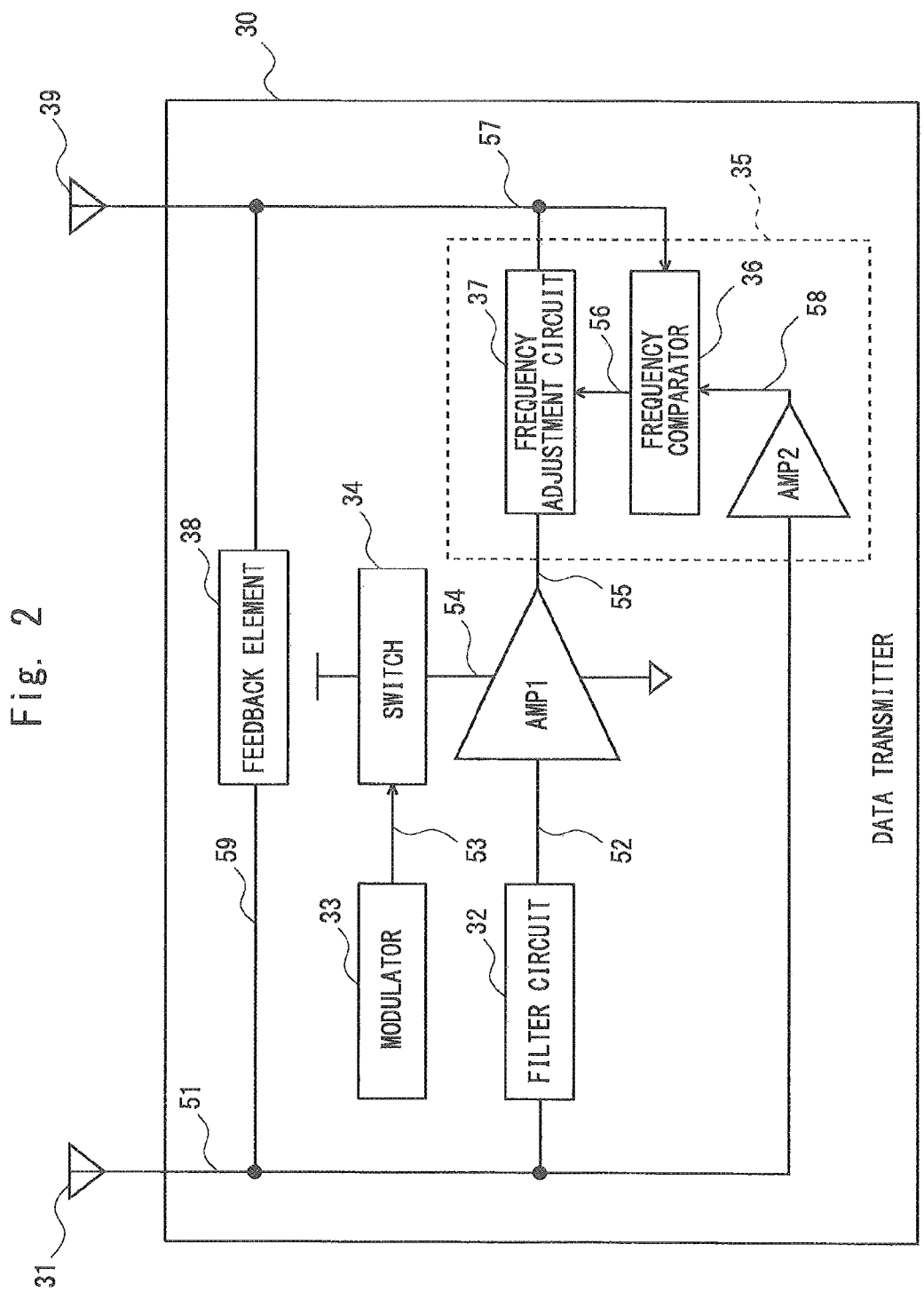
FIG. 2 is a block diagram for explaining details of a data transmitter used in the wireless communication system according to the first embodiment.

FIG. 2 is a block diagram for explaining the data transmitter 30 used in the wireless communication system according to this embodiment in detail. As shown in FIG. 2, the data transmitter 30 includes the first antenna 31, a filter circuit 32, the amplifier AMP1, the modulator 33, a switch 34, an oscillation frequency adjustment circuit 35, the feedback element 38, and the second antenna 39. The oscillation frequency adjustment circuit 35 includes an amplifier AMP2, a frequency comparator 36, and a frequency adjustment circuit 37.

The first antenna 31 receives the first radio wave 14 that is transmitted from the first radio equipment 10, and outputs a signal 51 corresponding to the first radio wave that is received by the first antenna 31 (i.e., the signal 51 is a reception signal) to the filter circuit 32 and the amplifier AMP2.

The filter circuit 32 is provided on the input node of the amplifier AMP1. The filter circuit 32 transmits a signal in a predetermined frequency band that is included in the signal 51, and removes a signal not in the predetermined frequency band. For example, the filter circuit 32 is composed of a band pass filter. A signal 52, an unnecessary frequency component of which has been removed by the filter circuit 32, is supplied to the amplifier AMP1. By selecting the frequency that transmits through the filter circuit 32, it is possible to set the oscillation frequency in the feedback loop to an arbitrary frequency.

The amplifier AMP1 amplifies the signal 52 supplied from the filter circuit 32, and outputs an amplified signal 55 to the frequency adjustment circuit 37. A power supply 54 is supplied to the amplifier AMP1 via the switch 34. The switch 34 turns on and off the power supply 54 that is supplied to the amplifier AMP1 according to a control signal 53 output from the modulator 33. The modulator 33 generates the control signal 53 according to the second data to be transmitted. That is, it is possible to switch between a state where the amplified signal 55 is output from the amplifier AMP1 and a state where the amplifier signal 55 is not output from the amplifier AMP1, according to the second data.

For example, when the second data to be transmitted is "1", the modulator 33 outputs the control signal 53 to turn on the switch 34. In this case, as the switch 34 is turned on, the power supply 54 is supplied to the amplifier AMP1. The amplifier AMP1 outputs the signal 55, which is the amplified signal 52 (i.e., the signal 55 corresponds to the second data "1"). At this time, the second radio wave 15 is transmitted from the second antenna 39.

Meanwhile, when the second data to be transmitted is "0", the modulator 33 outputs the control signal 53 for turning off the switch 34. In this case, as the switch 34 is turned off, the power supply 54 is not supplied to the amplifier AMP1. Accordingly, the low-level signal 55 (i.e., the signal 55 corresponds to the second data "0") is output from the amplifier AMP1. At this time, the second radio wave 15 is not transmitted from the second antenna 39.

The second data transmitted from the data transmitter 30 is data that is collected using a sensor (embedded in the modulator) included in, for example, the data transmitter 30. The sensor is, for example, a temperature sensor for measuring a body temperature of a human being and a pressure sensor for measuring blood pressure of a human being. For example, the temperature of an object to be measured can be checked sequentially by attaching the data transmitter with a built-in temperature sensor to the object to be measured, wirelessly transmitting the temperature information of the object to be measured, and receiving the temperature information by a wireless network. Note that the sensor is not limited to the temperature sensor or the pressure sensor, and any sensor may be used as long as it can acquire prescribed data.

Further, the second data that is transmitted from the data transmitter 30 may be data prestored in the data transmitter 30. In this case, the data transmitter 30 does not necessarily include the sensor and may have a configuration that includes a data storage unit for storing data. Furthermore, the second data transmitted from the data transmitter 30 may be data obtained by the data transmitter 30 from outside. In this case, the data transmitter 30 includes an input terminal, and the data transmitter 30 can obtain the external data via the input terminal.

The frequency adjustment circuit 37 adjusts a frequency of the signal 55 output from the amplifier AMP1 according to a control signal 56, and outputs a signal 57, a frequency of which has been adjusted. The signal 57 is supplied to the input node of the amplifier AMP1 via the feedback element 38 as a feedback signal 59. In this way, the feedback loop that passes through the filter circuit 32, the amplifier AMP1, the frequency adjustment circuit 37, and the feedback element 38 is formed. Further, a part of the signal 57 is transmitted from the second antenna 39 as the second radio wave 15.

The amplifier AMP2 amplifies the signal 51 to enable a comparison of the frequency of the signal 51 by the frequency comparator 36. The frequency comparator 36 compares the signal 57 that is output from the frequency adjustment circuit 37 with a signal 58 that is amplified by the amplifier AMP2, and controls the frequency adjustment circuit 37 according to a result of the comparison. Specifically, the frequency comparator 36 controls the frequency adjustment circuit 37 so that a frequency of the signal 57 that is output from the frequency adjustment circuit 37 will match a frequency of the signal 58 that is amplified by the amplifier AMP2. In other words, the frequency comparator 36 controls the frequency adjustment circuit 37 so that the oscillation frequency in the feedback loop will match a frequency of the first radio wave 14.

Note that the data transmitter 30 may have a configuration with a built-in battery or a configuration including a power generator that generates power using the first radio wave 14 that is received by the antenna 31.

Figure 3:
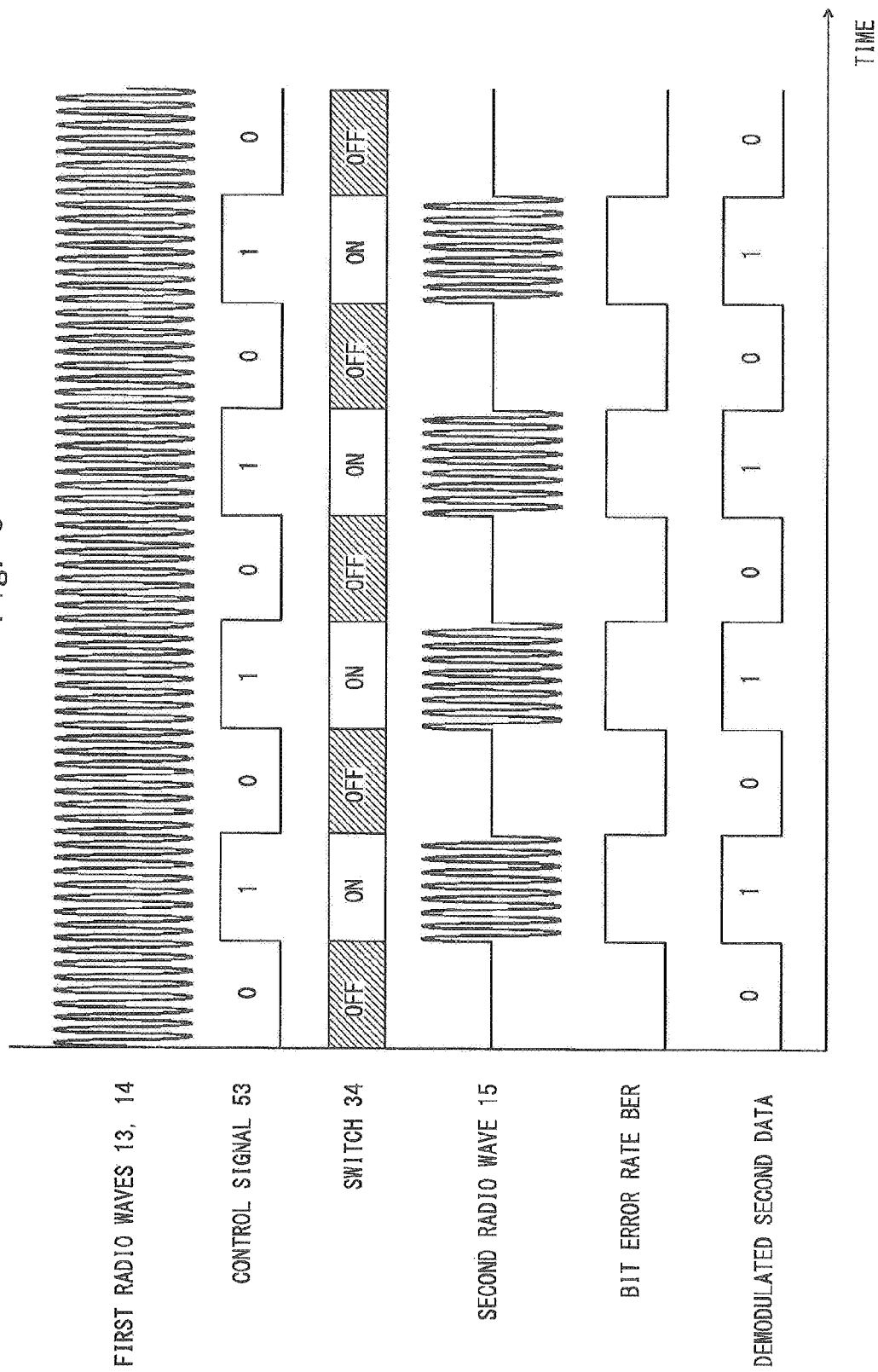
FIG. 3 is a timing chart for explaining an operation of the wireless communication system according to the first embodiment.

Next, an operation of the wireless communication system according to this embodiment shall be explained using a timing chart shown in FIG. 3. As shown in FIG. 3, the first radio equipment 10 transmits the first data using the first radio waves 13 and 14. The second radio equipment 20 receives the first radio wave 13, and demodulates the first data 23 included in the first radio wave 13. That is, the first radio equipment 10 and the second radio equipment 20 perform data communication.

The modulator 33 included in the data transmitter 30 outputs the control signal 53 according to the second data to be transmitted. For example, when the second data to be transmitted is "0", the modulator outputs the low-level ("0") control signal 53. Meanwhile, when the second data to be transmitted is "1", the modulator outputs the high-level ("1") control signal 53.

When the control signal 53 is a low level, the switch 34 is turned off. In this case, as the power supply 54 is not supplied to the amplifier AMP1, the second radio wave 15 is not transmitted. Meanwhile, when the control signal 53 is a high level, the switch 34 is turned on. In this case, as the power supply 54 is supplied to the amplifier AMP1, the second radio wave 15 is transmitted.

When the second radio wave 15 is not transmitted, the second radio wave 15 does not function as a disturbance of the first radio wave 13, thus the bit error rate BER of the first radio wave 13 will be low. At this time, the demodulator 22 of the second radio equipment 20 sets the second data transmitted from the data transmitter 30 to "0". Meanwhile, when the second radio wave 15 is transmitted, the second radio wave 15 functions as a disturbance of the radio wave 13, thus the bit error rate of communication between the first radio equipment and the second radio equipment will be high. At this time, the demodulator 22 of the second radio equipment 20 sets the second data transmitted from the data transmitter 30 to "1". By such an operation, the second data can be transmitted from the data transmitter 30 to the second radio equipment 20.

As described above, the first data transmitted from the first radio equipment 10 is transmitted using the first radio wave 13 having a modulation element in compliance with the standards of the first radio equipment 1 and the second radio equipment 20 (i.e., the radio wave having a carrier frequency in compliance with the standards). Meanwhile, the second data transmitted from the data transmitter 30 is transmitted using a variation in the bit error rate (i.e., the rise and fall of the bit error rate) in the radio waves (the first and second radio waves) received by the second radio equipment 20.

At this time, a cycle of the variation in the bit error rate of the radio waves that are received by the second wireless device 20 (i.e., the cycle is a modulation cycle of the bit error rate) is shorter than a modulation cycle of the first radio wave 13 including the carrier frequency in compliance with the standard. It is thus possible to separate the first data transmitted from the first radio equipment 10 and the second data transmitted from the data transmitter 30 using the demodulator 22.

Note that although an example of modulating the second radio wave by turning on and off the power supply 54 that is supplied to the amplifier AMP1 has been explained so far, the method of modulating the second radio wave is not limited to this. For example, a switch may be connected in series to a predetermined position in the feedback loop, and by turning on and off the switch, the second radio wave may be modulated. That is, when the switch is turned on, the second radio wave is transmitted because the feedback loop is formed. Meanwhile, when the switch is turned off, the second radio wave is not transmitted because the feedback loop is not formed. Moreover, the method of modulating the second radio wave is not limited to the on-off-keying and may be the method to modulate intensity of the second radio wave (i.e., the modulation using the high and low of the intensity).

Figure 4:
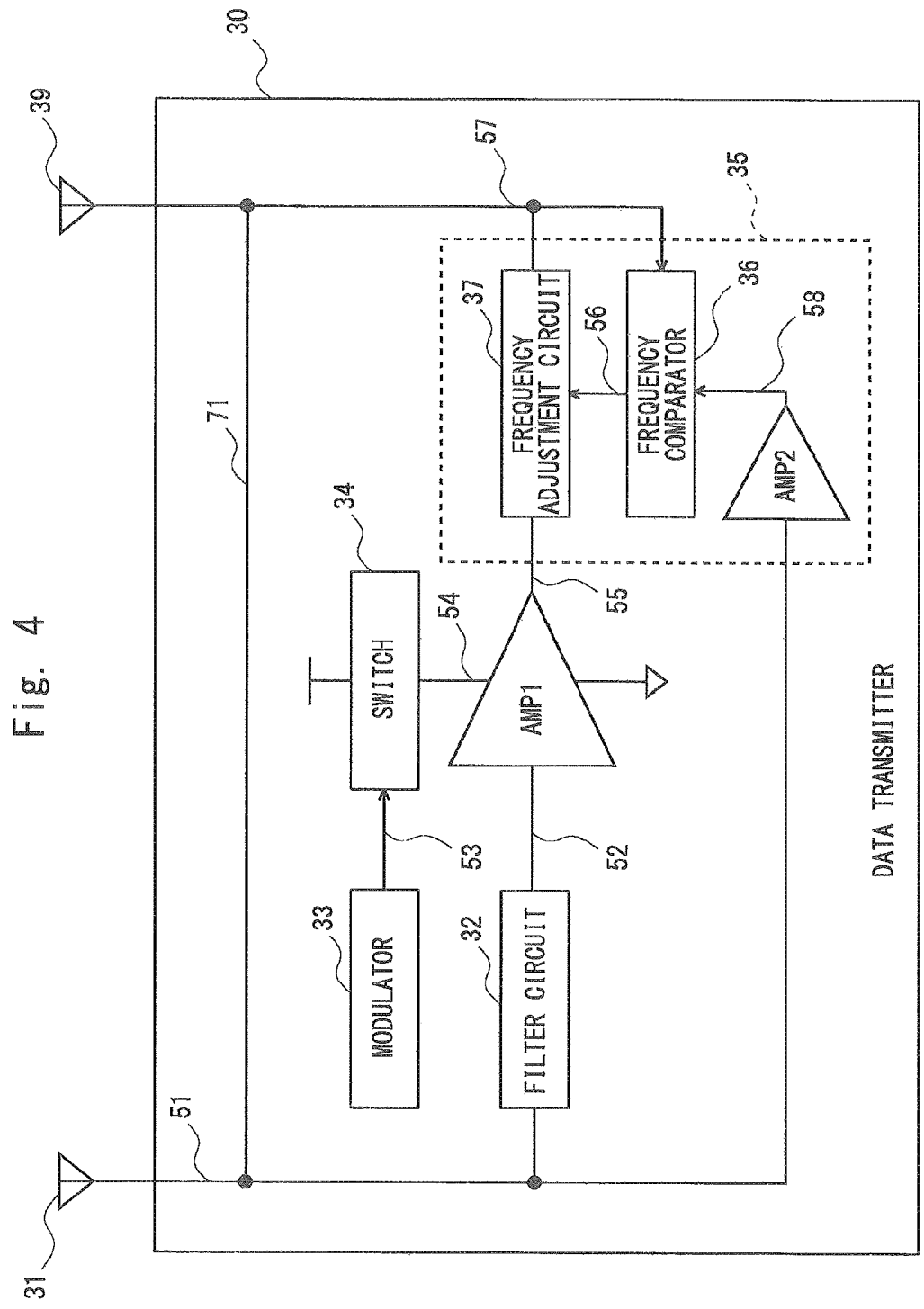
FIG. 4 is a block diagram showing an example of the data transmitter used in the wireless communication system according to the first embodiment.
Figure 5:
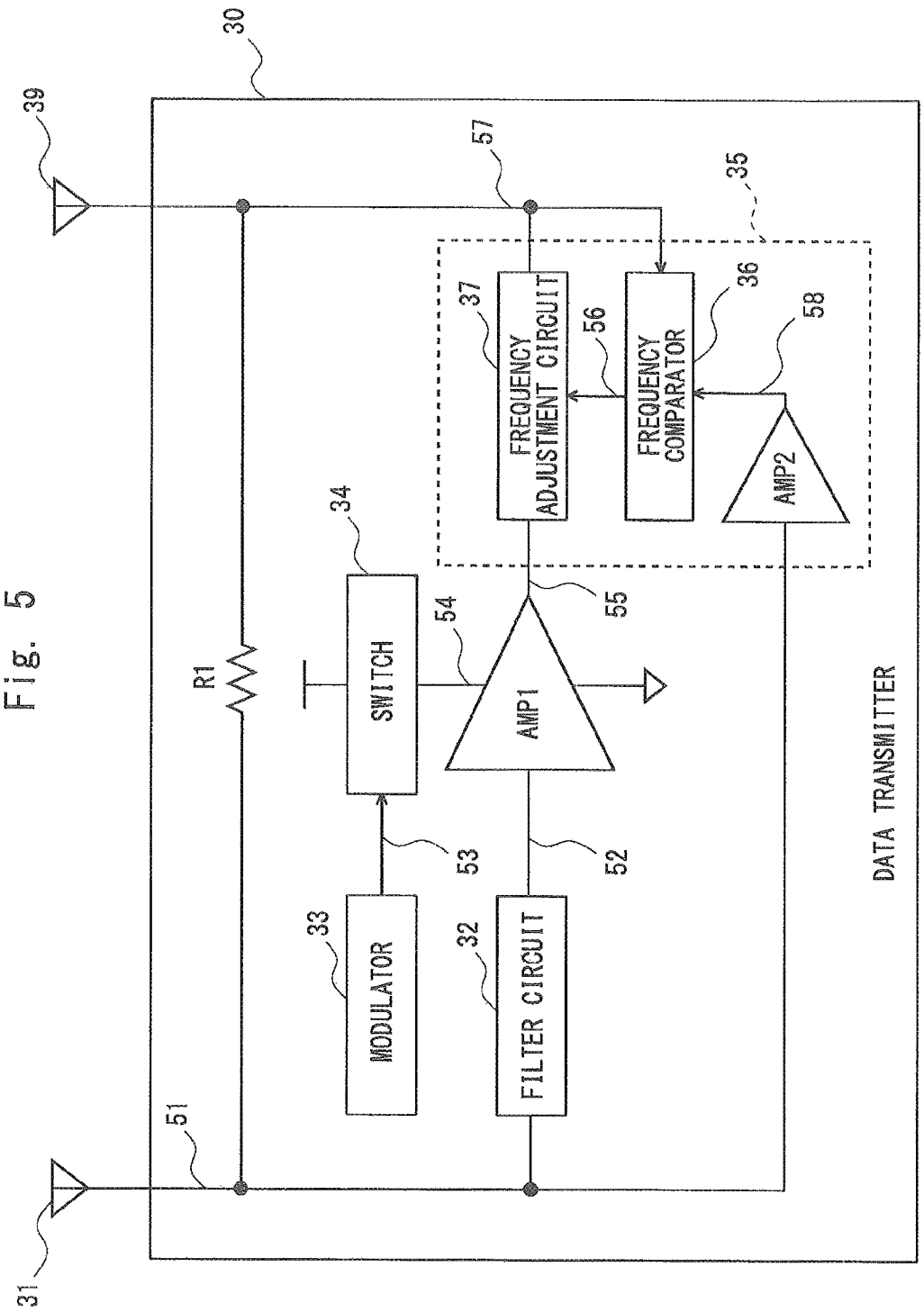
FIG. 5 is a block diagram showing an example of the data transmitter used in the wireless communication system according to the first embodiment.
Figure 6:
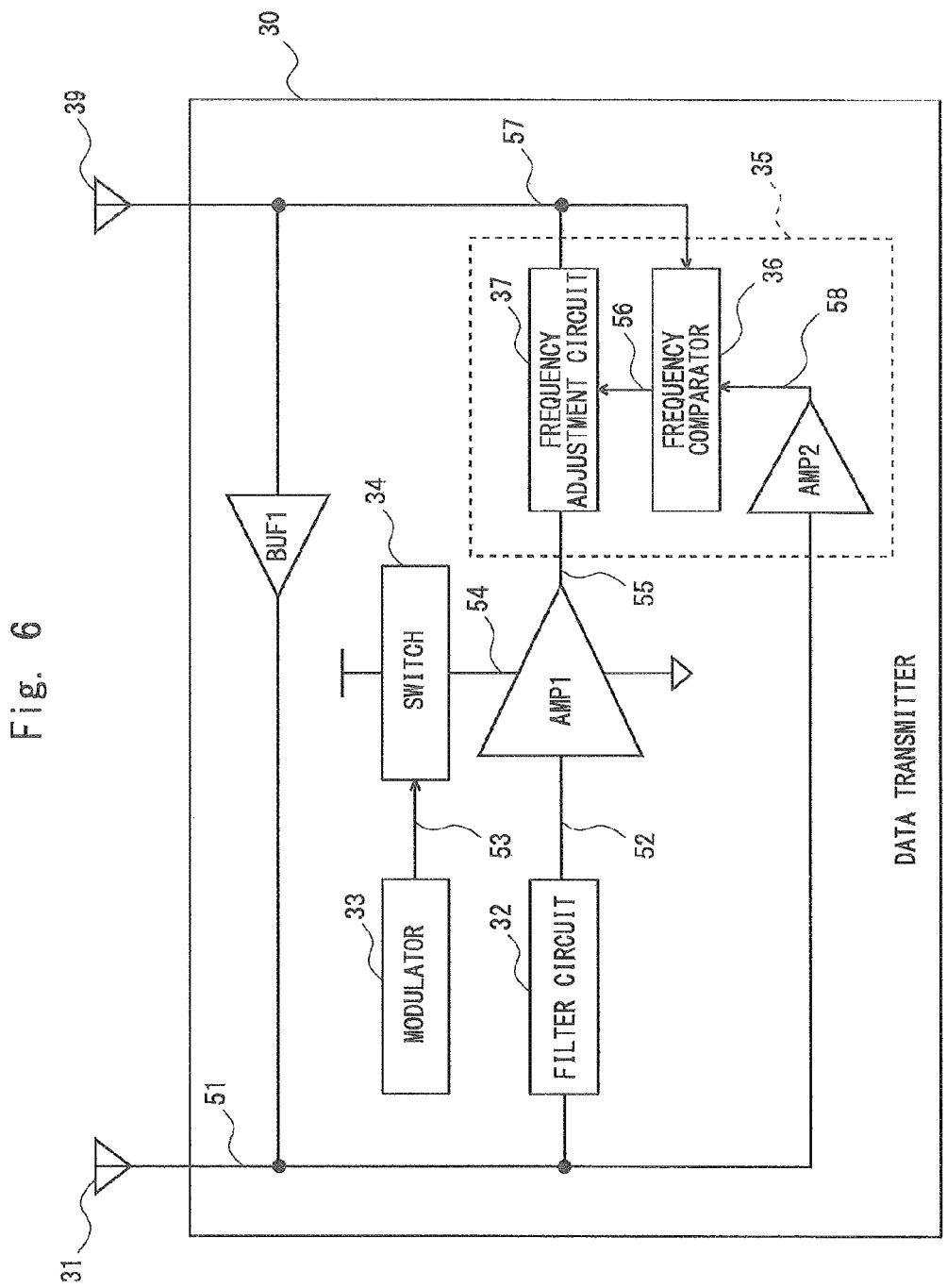
FIG. 6 is a block diagram showing an example of the data transmitter used in the wireless communication system according to the first embodiment.

Next, an example of the feedback element 38 shall be explained using FIGS. 4 to 6. The feedback element 38 may be configured using a line 71, as shown in FIG. 4. That is, the first antenna 31 and the second antenna 39 (in other words, between the output node and the input node of the amplifier AMP) may be connected using the line 71.

Further, the feedback element 38 may be configured using a resistor R1, as shown in FIG. 5. That is, the first antenna 31 and the second antenna 39 may be connected using the resistor R1. A signal, which is obtained by adding a voltage amplitude of the signal received by the first antenna 31 and a voltage amplitude of the feedback signal, is supplied to the input node of the amplifier AMP1. Thus, when the distance between the first radio equipment 10 and the data transmitter 30 is short, the voltage amplitude of the signal supplied to the input node of the amplifier AMP1 will become large, possibly destroying the amplifier AMP1.

In the example shown in FIG. 5, the first antenna 31 and the second antenna 39 are connected using the resistor R1. It is thus possible to limit the voltage amplitude of the signal supplied to the input node of the amplifier AMP1, thereby preventing the amplifier AMP1 from being destroyed.

Alternatively, the feedback element 38 may be configured using a buffer BUF1, as shown in FIG. 6. That is, the first antenna 31 and the second antenna 39 may be connected using the buffer BUF1. For example, when the distance between the first radio equipment 10 and the data transmitter 30 is short, the voltage amplitude of the signal received by the first antenna 31 will become small. Thus, a sufficient gain may not be obtained only by the amplifier AMP1.

In the example shown in FIG. 6, as the first antenna 31 and the second antenna 39 are connected using the buffer BUF1, a feedback signal can be amplified using the buffer BUF1 to thereby obtain a necessary voltage amplitude (which is a gain).

Figure 7:
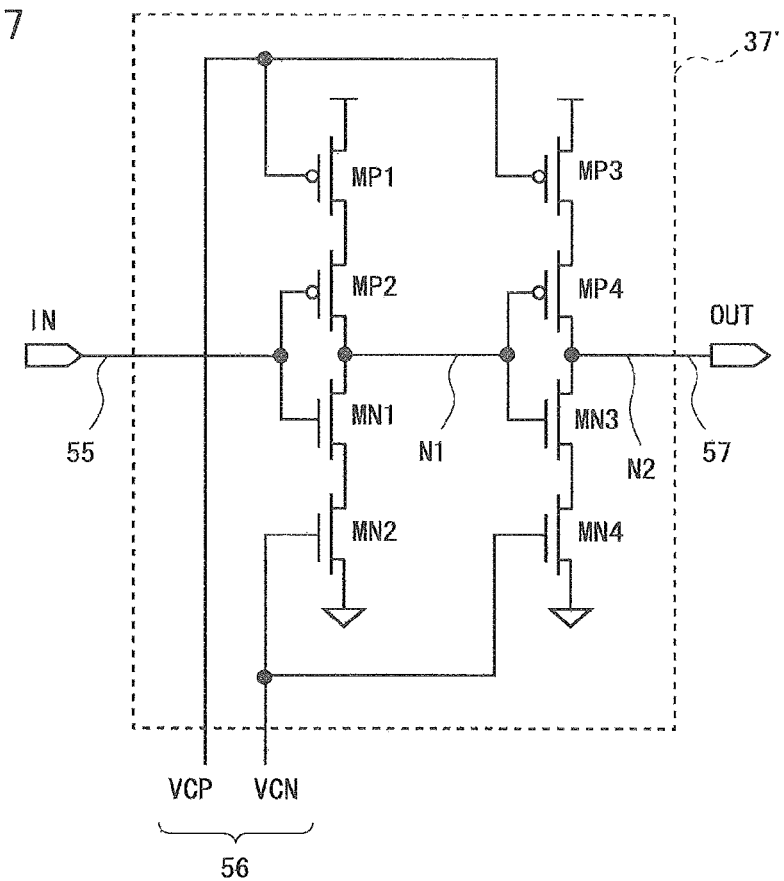
FIG. 7 is a circuit diagram showing an example of a frequency adjustment circuit.
Figure 8:
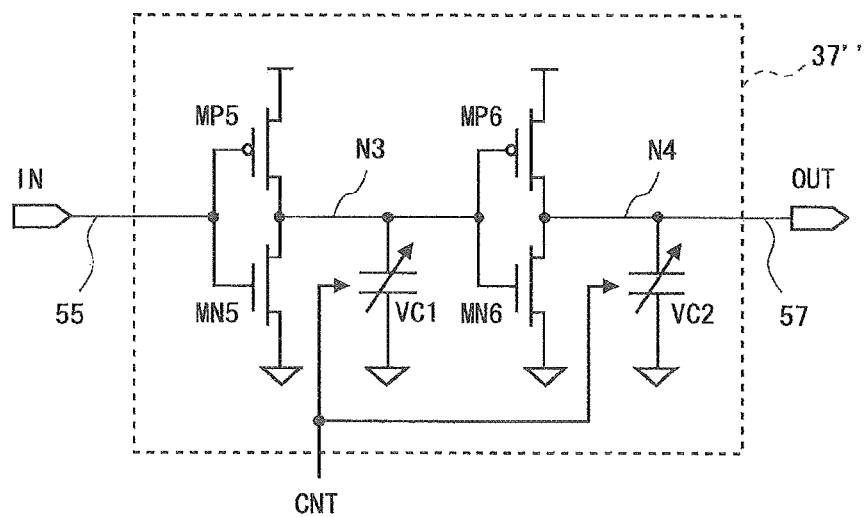
FIG. 8 is a circuit diagram showing an example of the frequency adjustment circuit.

Next, an example of the frequency adjustment circuit 37 shall be explained using FIGS. 7 and 8. A frequency adjustment circuit 37' shown in FIG. 7 includes P-type transistors MP1 to MP4 and N-type transistors MN1 to MN4. As for the P-type transistor MP1, the source is connected to a power supply, the drain is connected to the source of the P-type transistor MP2, and a control voltage VCP is supplied to the gate. As for the P-type transistor MP2, the source is connected to the drain of the P-type transistor MP1, the drain is connected to a node N1, and the signal 55 that is amplified by the amplifier AMP1 is supplied to the gate.

As for the N-type transistor MN1, the drain is connected to the node N1, the source is connected to the drain of the N-type transistor MN2, and the signal 55 is supplied to the gate. As for the N-type transistor MN2, the drain is connected to the source of the N-type transistor MN1, the source is connected to a ground, and a control voltage VCN is supplied to the gate.

As for the P-type transistor MP3, the source is connected the power supply, the drain is connected to the source of the P-type transistor MP4, and the control voltage VCP is supplied to the gate. As for the P-type transistor MP4, the source is connected to the drain of the P-type transistor MP3, the source is connected to a node N2, and the gate is connected to the node N1.

As for the N-type transistor MN3, the drain is connected to the node N2, the source is connected to the drain of the N-type transistor MN4, and the gate is connected to the node N1. As for the N-type transistor MN4, the drain is connected to the source of the N-type transistor MN3, the source is connected to the ground, and the control voltage VCN is supplied to the gate.

The P-type transistor MP2 and the N-type transistor MN1 constitute an inverter, and the P-type transistor MP4 and the N-type transistor MN3 constitute an inverter.

The control voltages VCP and VCN are control signals having a predetermined constant voltage and correspond to the control signal 56 that is output from the frequency comparator 36. The amount of current flowing through the P-type transistors MP1 and MP3 varies according to the control voltage VCP. Specifically, the lower the control voltage VCP becomes, the more the amount of current flows through the P-type transistors MP1 and MP3. Further, the amount of current flowing through the N-type transistors MN2 and MN4 varies according to the control voltage VCN. Specifically, the higher the control voltage VCN becomes, the more the amount of current flows through the N-type transistors MN2 and MN4.

The frequency adjustment circuit 37' shown in FIG. 7 adjusts the control voltages VCP and VCN to thereby adjust rising or falling timings of the nodes N1 and N2 when the signal 55 transitions, thereby adjusting the frequencies. In other words, in the frequency adjustment circuit 37' shown in FIG. 7, the frequencies are adjusted by delaying the signal 55 according to the control voltages VCP and VCN. Note that the rising of the node N1 indicates a state where a potential of the node N1 transitions from a low level to a high level. Similarly, the falling of the node N1 indicates a state where the potential of the node N1 transitions from a high level to a low level.

For example, when the signal 55 transitions from a high level to a low level, the P-type transistor MP2 is turned on, and the N-type transistor MN1 is turned off. A timing at which the node N1 rises depends on the control voltage VCP. For example, when the control voltage VCP is low, the amount of current flowing through the P-type transistor MP1 is large, thus the rising of the node N1 becomes early. Meanwhile, when the control voltage VCP is high, the amount of current flowing through the P-type transistor MP1 is small, thus the rising of the node N1 will be delayed.

Likewise, for example, when the signal 55 transitions from a low level to a high level, the P-type transistor MP2 is turned off, and the N-type transistor MN1 is turned on. At this time, a timing at which the node N1 falls depends on the control voltage VCN. For example, when the control voltage VCN is high, the amount of current flowing through the N-type transistor MN2 is large, thus the falling of the node N1 becomes early. Meanwhile, when the control voltage VCN is low, the amount of current flowing through the N-type transistor MN2 is small, thus the falling of the node N1 will be delayed.

Operations of the P-type transistors MP3 and MP4 and the N-type transistors MN3 and MN4 are similar to the one explained above. As described above, in the frequency adjustment circuit 37' shown in FIG. 7, the signal 55 is delayed according to the control voltages VCP and VCN to thereby adjust the frequency of the signal 55.

Next, a frequency adjustment circuit 37" shown in FIG. 8 shall be explained. The frequency adjustment circuit 37" includes P-type transistors MP5 and MP6, N-type transistors MN5 and MN6, and variable capacitors VC1 and VC2. As for the P-type transistor MP5, the source is connected to a power supply, the drain is connected to a node N3, and the signal 55 is supplied to the gate. As for the N-type transistor MN5, the drain is connected to the node N3, the signal 55 is supplied to the gate, and the source is connected to a ground. That is, the P-type transistor MP5 and the N-type transistor MN5 constitute an inverter.

As for the P-type transistor MP6, the source is connected to the power supply, the drain is connected to a node N4, and the gate is connected to the node N3. As for the N-type transistor MN6, the drain is connected to the node N4, the gate is connected to the node N3, and the source is connected to the ground. That is, the P-type transistor MP6 and the N-type transistor MN6 constitute an inverter.

One end of the variable capacitor VC1 is connected to the node N3, while the other end of the variable capacitor VC1 is connected to the ground. One end of the variable capacitor VC2 is connected to the node N4, while the other end of the variable capacitor VC2 is connected to the ground. Capacities of the variable capacitors VC1 and VC2 are adjusted by a control signal CNT.

In the frequency adjustment circuit 37" shown in FIG. 8, it is possible to adjust the rising and falling timings of the nodes N1 and N2 when the signal 55 transitions according to the capacities of the variable capacitors VC1 and VC2. For example, when the signal 55 transitions from a high level to a low level, the P-type transistor MP5 is turned on, and the N-type transistor MN5 is turned off. At this time, a timing at which the node N3 rises depends on the capacity of the variable capacitor VC1. That is, the greater the capacity of the variable capacitor VC1, the longer the time taken to charge the variable capacitor VC1, thus the rising of the node N3 will be delayed. On the contrary, the smaller the capacity of the variable capacitor VC1, the shorter the time taken to charge the variable capacitor VC1, thus the rising of the node N3 will be early.

Likewise, when the signal 55 transitions from a low level to a high level, the P-type transistor MP5 is turned off, and the N-type transistor MN5 is turned on. At this time, a timing at which the node N3 falls depends on the capacity of the variable capacitor VC1. That is, the greater the capacity of the variable capacitor VC1, the longer the time taken to discharge the variable capacitor VC1, thus the falling of the node N3 will be delayed. On the contrary, the smaller the capacity of the variable capacitor VC1, the shorter the time taken to discharge the variable capacitor VC1, thus the falling of the node N3 will be early.

Operations of the P-type transistor MP6, the N-type transistor MN6, and the variable capacitor VC2 are similar to the one explained above. As described above, in the frequency adjustment circuit 37" shown in FIG. 8, the capacities of the variable capacitors VC1 and VC2 are adjusted according to the control signal CNT to thereby adjust the frequency of the signal 55.

As explained in Background, in the wireless communication system using the RFID technology, data is transmitted to a predetermined radio equipment from the RFID radio tag (a data transmitter). The data transmitter here is, for example, a sensor node, and distributed and disposed in order to obtain predetermined information. For example, it is assumed that the sensor nodes are distributed and disposed in a daily life space or a space where it is difficult for human beings to enter. Thus, when the frequency of battery exchange in the sensor node increases, convenience of the wireless communication system deteriorates. In order to reduce the frequency of battery exchange in the sensor node, it has been necessary to reduce the power consumption of the sensor node. As the power consumption of radio communication parts accounts for much of the power consumption of the entire sensor node, it has been required to reduce the power consumption of the radio communication parts.

Meanwhile, in order to increase the transmission power of the data transmitter, the gain of the amplifier mounted on the data transmitter needs to be increased. However, there has been a problem that when the gain of the amplifier is increased, the power consumption of the data transmitter increases. That is, in order to increase the gain of the amplifier, there are methods of increasing the size of a transistor constituting the amplifier or connecting multiple stages of amplifiers. However, the power consumption of the entire circuit increases in these methods.

Therefore, in the wireless communication system according to this embodiment, the feedback element 38 is provided in the data transmitter 30 to feedback a signal from the output node of the amplifier AMP1 to the input node of the amplifier AMP1. By forming the feedback loop in this way, the amplifier AMP1 oscillates to thereby improve the gain of the amplifier AMP1 while reducing the power consumption of the data transmitter 30.

Thus, according to this embodiment, it is possible to provide a wireless communication system and a data transmitter that are capable of increasing transmission power of the data transmitter while reducing power consumption of the data transmitter.

Second Embodiment

Figure 9:
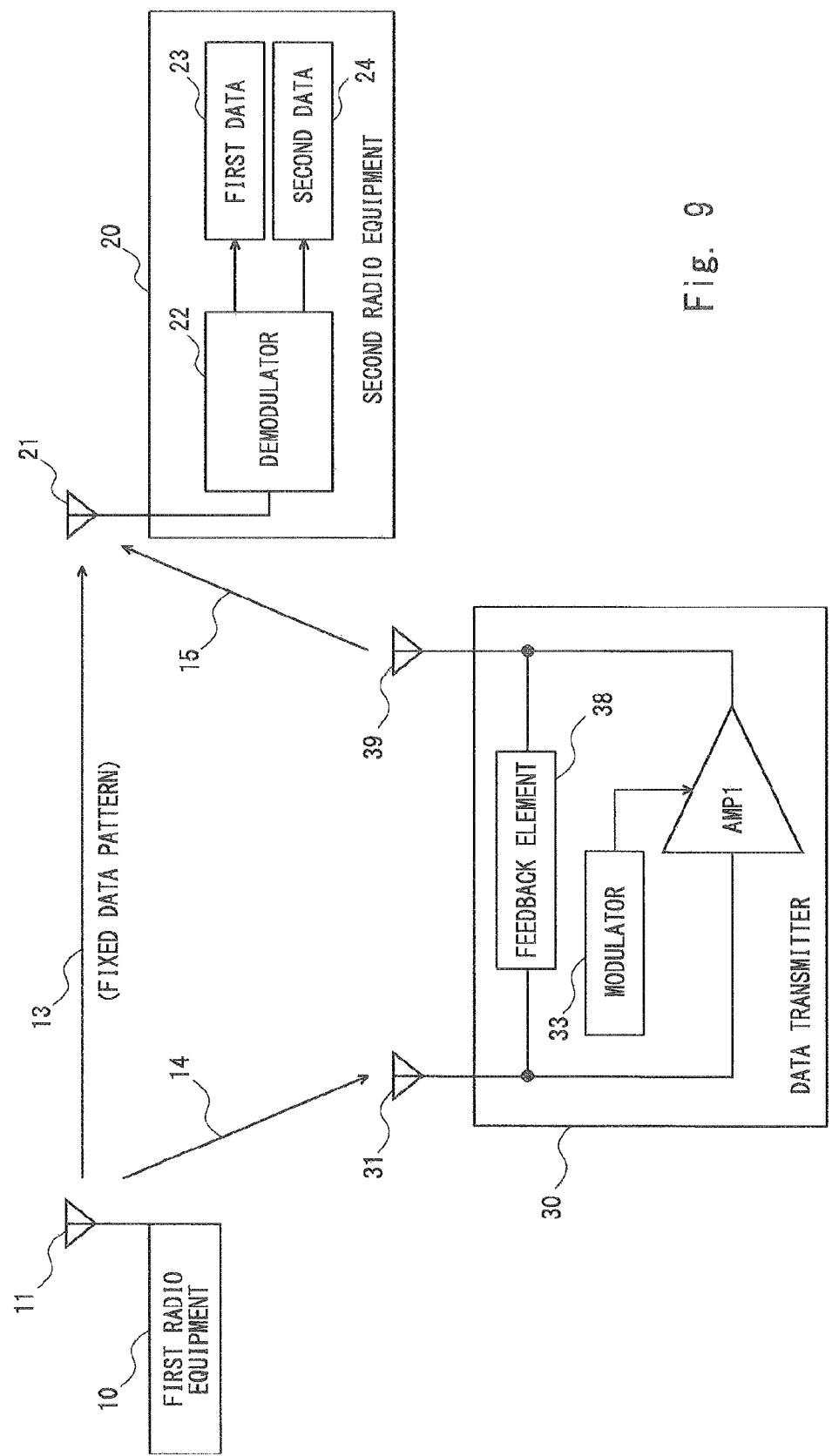
FIG. 9 is a block diagram showing a wireless communication system according to a second embodiment.

Next, a second embodiment shall be explained. FIG. 9 is a block diagram showing a wireless communication system according to a second embodiment. In the wireless communication system explained in the first embodiment, when the second data is transmitted from the data transmitter 30 to the second radio equipment 20, the first data that is transmitted from the first radio equipment 10 to the second radio equipment 20 is arbitrary data. Meanwhile, in the wireless communication system according to this embodiment, when the second data is transmitted from the data transmitter 30 to the second radio equipment 20, the first data transmitted from the first radio equipment 10 to the second radio equipment 20 is a fixed data pattern. As a configuration of the wireless communication system according to this embodiment other than the above-mentioned configuration is the same as that of the wireless communication system explained in the first embodiment, a repeated explanation shall be omitted.

In the wireless communication system according to this embodiment, the first radio equipment 10 transmits a predetermined data pattern (a fixed data pattern) as the first data. The second radio equipment 20 uses an expected value of the predetermined data pattern in calculation of the bit error rate of communication between the first radio equipment and the second radio equipment.

As the predetermined data pattern, for example, single tone transmission, which is sequential transmission of data "0" or sequential transmission of data "1", or a data pattern that alternately transmits data "0" and data "1" (i.e., 0,1,0,1,0,1,0 . . . ) may be used.

Further, as another predetermined data pattern, a pseudo random noise pattern may be used. As the pseudo random noise pattern, for example, a data pattern of a 7-bit sequence of PN3(1,0,0,1,1,1,0), a 15-bit sequence of PN4(0,1,0,0,1,1, 0,1,0,1,1,1,1,0,0), and 31-bit sequence of PN5(1,0,0,0,1,1,1, 1,1,0,0,1,1,0,1,0,0,1,0,0,0,0,1,0,1,0,1,1,1, 0,1) may be used. Furthermore, as another predetermined data pattern, sequential transmission of data "0" or sequential transmission of data "1" using Manchester encoding may be used.

The modulation method for transmitting the above-mentioned predetermined data pattern may be any of amplitude modulation, frequency modulation, or phase modulation.

Figure 10:
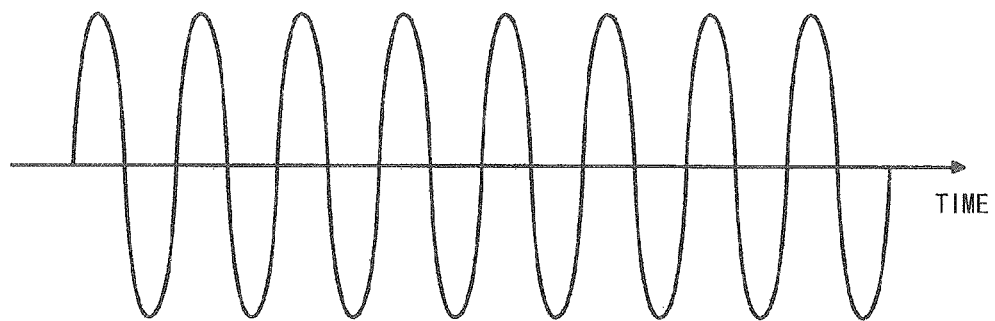
FIG. 10 is a diagram showing an example of a waveform of a first radio wave (single tone transmission)
Figure 11:
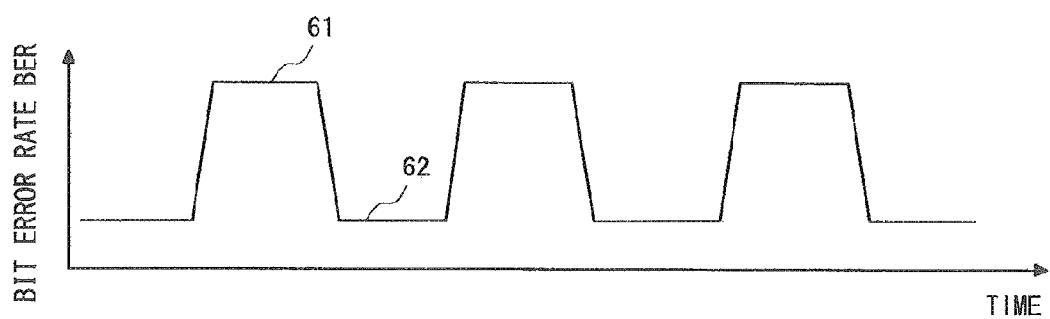
FIG. 11 is a diagram showing a variation in a bit error rate of communication between the first radio equipment and the second radio equipment.

FIG. 10 is a diagram showing an example of a waveform of the first radio wave 13. The waveform of the first radio wave 13 shown in FIG. 10 indicates a waveform of single tone transmission (the modulation method is the frequency modulation method). Further, FIG. 11 is a diagram showing a variation in the bit error rate of communication between the first radio equipment and the second radio equipment. In FIG. 11, a code 61 indicates a part where the bit error rate is high, while a code 62 indicates a part where the bit error rate is low. As shown in FIGS. 10 and 11, the first data that is transmitted from the first radio equipment 10 to the second radio equipment 20 is a fixed data pattern, and an expected value of the first data (the fixed data pattern) is used by the second radio equipment 20 to calculate the bit error rate of communication between the first radio equipment and the second radio equipment. In this way, it is easy to detect a fluctuation in the bit error rate of communication between the first radio equipment and the second radio equipment. It is thus possible to improve an S/N ratio of the bit error rate, thereby improving the communication sensitivity.

Figure 12:
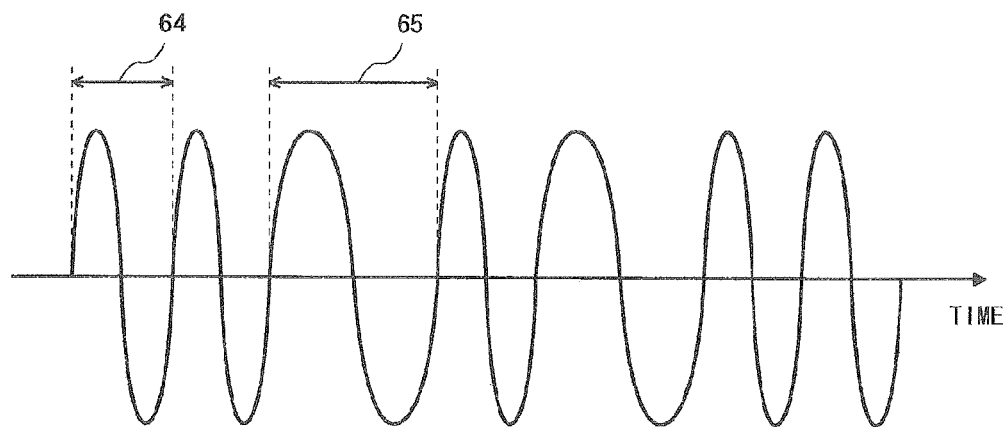
FIG. 12 is a diagram showing an example of a waveform of the first wave (frequency modulation)
Figure 13:
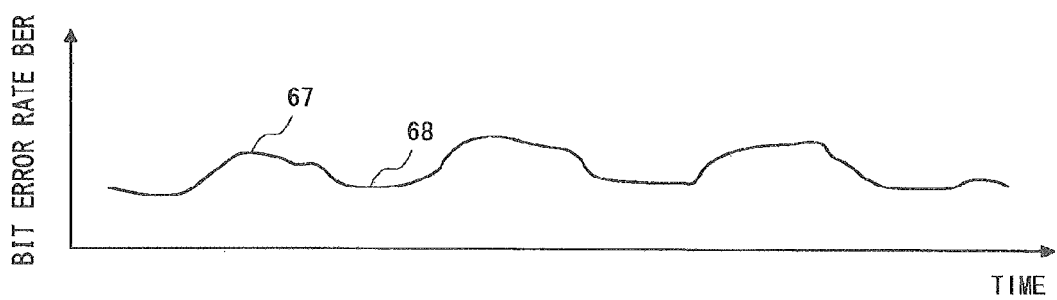
FIG. 13 is a diagram showing a variation in the bit error rate of communication between the first radio equipment and the second radio equipment (a comparative example)

FIG. 12 is a diagram showing an example of the waveform of the first radio wave 13, which is an example of the waveform of the first radio wave 13 when the fixed data pattern is not used (the modulation method is the frequency modulation method). As shown in FIG. 12, when the fixed data pattern is not used, the frequency of the first radio wave 13 fluctuates as indicated by codes 64 and 65. FIG. 13 is a diagram showing a variation in the bit error rate of communication between the first radio equipment and the second radio equipment (a comparative example). In FIG. 13, a code 67 indicates a part where the bit error rate is high, while a code 68 indicates a part where the bit error rate is low. As shown in FIG. 13, when the fixed data pattern is not used, the S/N ratio of the bit error rate is reduced, thereby deteriorating the communication sensitivity.

As described above, in the wireless communication system according to this embodiment, when the second data is transmitted from the data transmitter 30 to the second radio equipment 20, the first data that is transmitted from the first radio equipment 10 to the second radio equipment 20 is the fixed data pattern. This facilitates detection of a fluctuation in the bit error rate to thereby improve the S/N ratio of the bit error rate. It is therefore possible to improve the communication sensitivity when the second data is transmitted from the data transmitter 30 to the second radio equipment 20.

Third Embodiment

Figure 14:
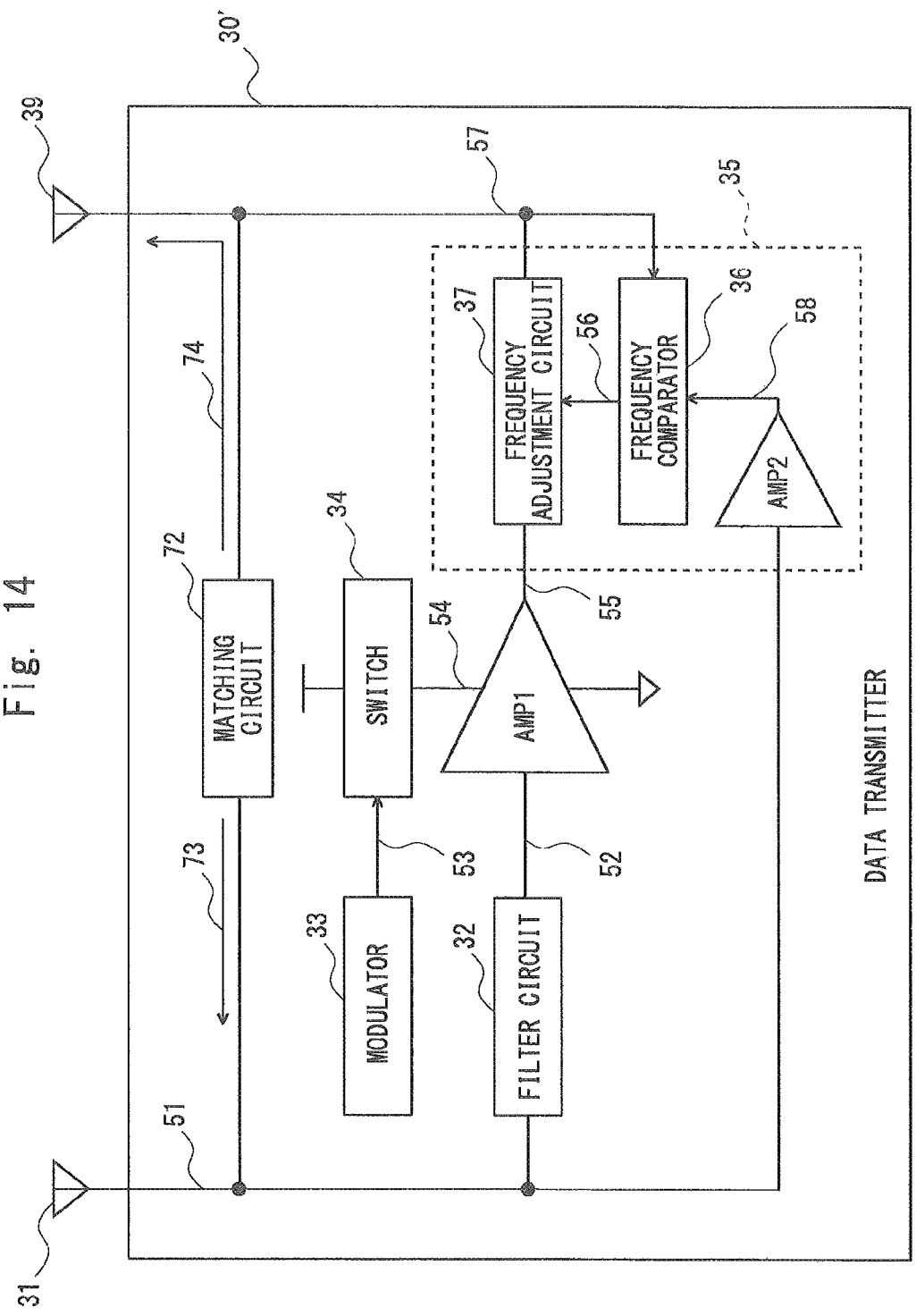
FIG. 14 is a block diagram showing a data transmitter used in a wireless communication system according to a third embodiment.

Next, a third embodiment shall be explained. FIG. 14 is a block diagram showing a data transmitter 30' included in a wireless communication system according to the third embodiment. The wireless communication system according to this embodiment differs from that of the first embodiment in that the data transmitter 30' includes a matching circuit 72 as a feedback element. As the configuration of the wireless communication system according to this embodiment other than the above-mentioned configuration is the same as that of the wireless communication systems explained in the first and second embodiments, the same components are denoted by the same reference numerals, and a repeated explanation shall be omitted.

The matching circuit 72 included in the data transmitter 30' adjusts a ratio between the power of the second radio wave 15 that is transmitted from the second antenna 39 (i.e., power of a reflection signal 74) and the power of a transmitted signal 73 that is feedbacked via the feedback loop.

Figure 15:
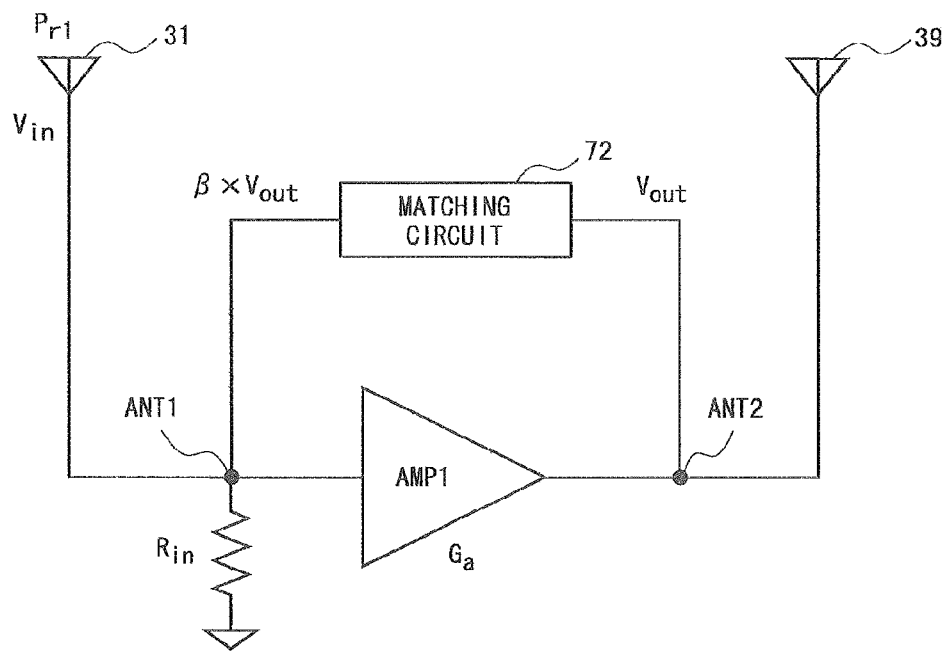
FIG. 15 is a diagram for explaining a condition for a feedback loop to perform a full swing operation.

The matching circuit 72 is designed so that the power of the reflection signal 74 will become large enough for the power of the transmitted signal 73 (e.g., the power of the transmitted signal 73:the power of the reflection signal 74=1:9). That is, only the power necessary for a voltage amplitude to make a full swing in the feedback loop is feedbacked, and the remaining power is transmitted from the second antenna 39 as the second radio wave 15. Then, the transmission power of the second radio wave 15 can be increased. Moreover, when the voltage amplitude makes a full swing in the feedback loop, the amplifier AMP1 is switched from an amplifier operation to a switching operation, thereby reducing the power consumption of the amplifier AMP1. Hereinafter, a condition for the feedback loop to perform a full swing operation shall be explained with reference to FIG. 15.

Suppose that an output voltage of the amplifier AMP1 is $V_{out}$, for the feedback loop to perform the full swing operation, it is necessary to satisfy $V_{out}=V_{DD}$. The $V_{DD}$ here is a power supply voltage. As the feedback loop is a positive feedback, the following expression 1 can be derived, where $G_a$ is a power gain of the amplifier AMP1, $V_{in}$ is an input voltage, and $\beta$ is a transmittance of the matching circuit.

$$V_{out} = \frac{G_a}{1 - G_a \beta} V_{in} \qquad \text{Expression 1}$$

Accordingly, the transmittance $\beta$ of the matching circuit can be represented by the following expression 2. In this expression, $P_{r1}$ is reception power of the first radio wave 14 received by the first antenna 31, and $R_{in}$ is an input resistance of the amplifier AMP1.

$$\beta = \frac{V_{DD} - G_a V_{in}}{G_a V_{DD}} \qquad \text{Expression 2}$$
$$= \frac{V_{DD} - G_a \sqrt{\frac{P_{r1}}{R_{in}}}}{G_a V_{DD}}$$

For example, when the power gain $G_a=10$ dB, the reception power $P_{r1}=-40$ dBm, and the input resistance $R_{in}=50\Omega$, the transmittance $\beta$ can be calculated as in the following expression 3.

$$\beta \cong 0.1 \qquad \text{Expression 3}$$

Accordingly, in this case, in order for the feedback loop to perform the full swing operation, the matching circuit 72 is designed so that a ratio between the power of the transmitted signal 73 and the power of the reflection signal 74 in the matching circuit 72 will be 1:9. FIGS. 16A to 16D are circuit diagrams showing examples of the matching circuit 72.

Figure 16A:
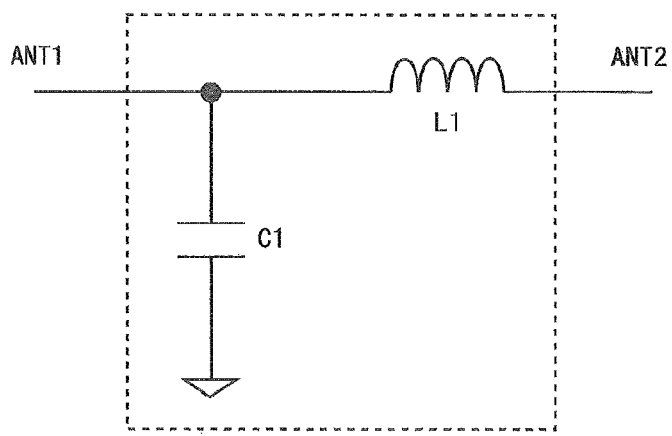
FIG. 16A is a circuit diagram showing an example of a matching circuit.

As shown in FIG. 16A, the matching circuit 72 can be composed of a capacitor C1, one end of which being connected to a node ANT1 and the other end of which being connected to a ground, and an inductor L1, one end of which being connected to a node ANT2 and the other end of which being connected to the node ANT1. The node ANT1 is a node on the first antenna 31 side, while the node ANT2 is a node on the second antenna 39 side (see FIG. 15).

Figure 16B:
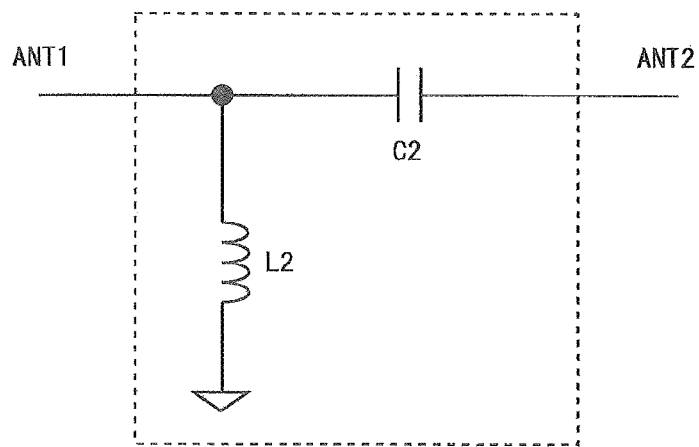
FIG. 16B is a circuit diagram showing an example of the matching circuit.
Figure 16C:
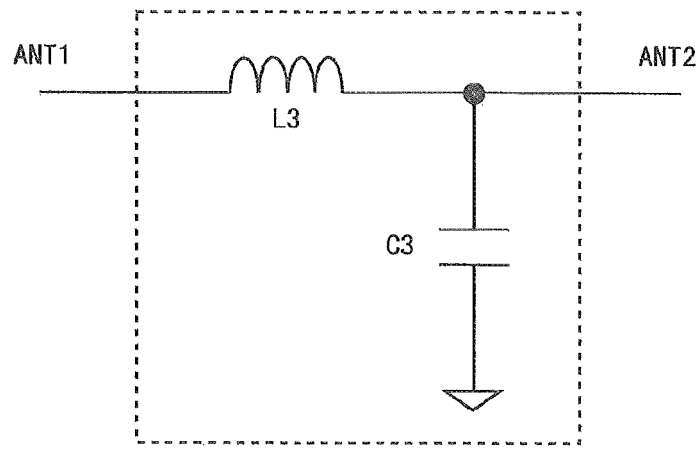
FIG. 16C is a circuit diagram showing an example of the matching circuit.
Figure 16D:
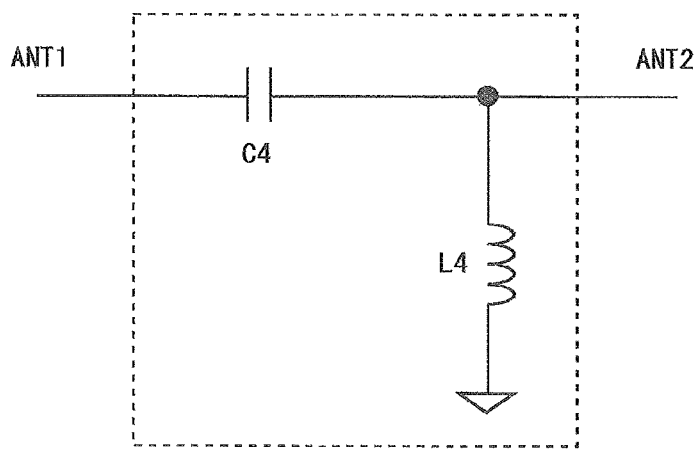
FIG. 16D is a circuit diagram showing an example of the matching circuit.

Further, as shown in FIG. 16B, the matching circuit 72 can be composed of an inductor L2, one end of which being connected to the node ANT1 and the other end of which being connected to the ground, and a capacitor C2, one end of which being connected to the node ANT2 and the other end of which being connected to the node ANT1. Furthermore, as shown in FIG. 16C, the matching circuit 72 can be composed of a capacitor C3, one end of which being connected to the node ANT2 and the other end of which being connected to the ground, and an inductor L3, one end of which being connected to the node ANT2 and the other end of which being connected to the node ANT1. Moreover, as shown in FIG. 16D, the matching circuit 72 can be composed of an inductor L4, one end of which being connected to the node ANT2 and the other end of which being connected to the ground, and a capacitor C4, one end of which being connected to the node ANT2 and the other end of which being connected to the node ANT1.

A ratio between the power of the transmitted signal 73 and the power of the reflection signal 74 in the matching circuit 72 can be determined by adjusting values of the inductors and values of capacitors in the matching circuits shown in FIGS. 16A to 16D. Note that the matching circuits shown in FIGS. 16A to 16D are merely examples, and the matching circuit is not limited to these circuits.

As explained so far, in this embodiment, the matching circuit 72 is provided in the data transmitter 30', so that the power of the reflection signal 74 is sufficiently greater than the power of the transmitted signal 73. That is, only the power necessary for the voltage amplitude to make a full swing in the feedback loop is feedbacked, and the remaining power is transmitted from the second antenna 39 as the second radio wave 15. It is thus possible to increase the transmission power of the second radio wave 15.

Fourth Embodiment

Figure 17:
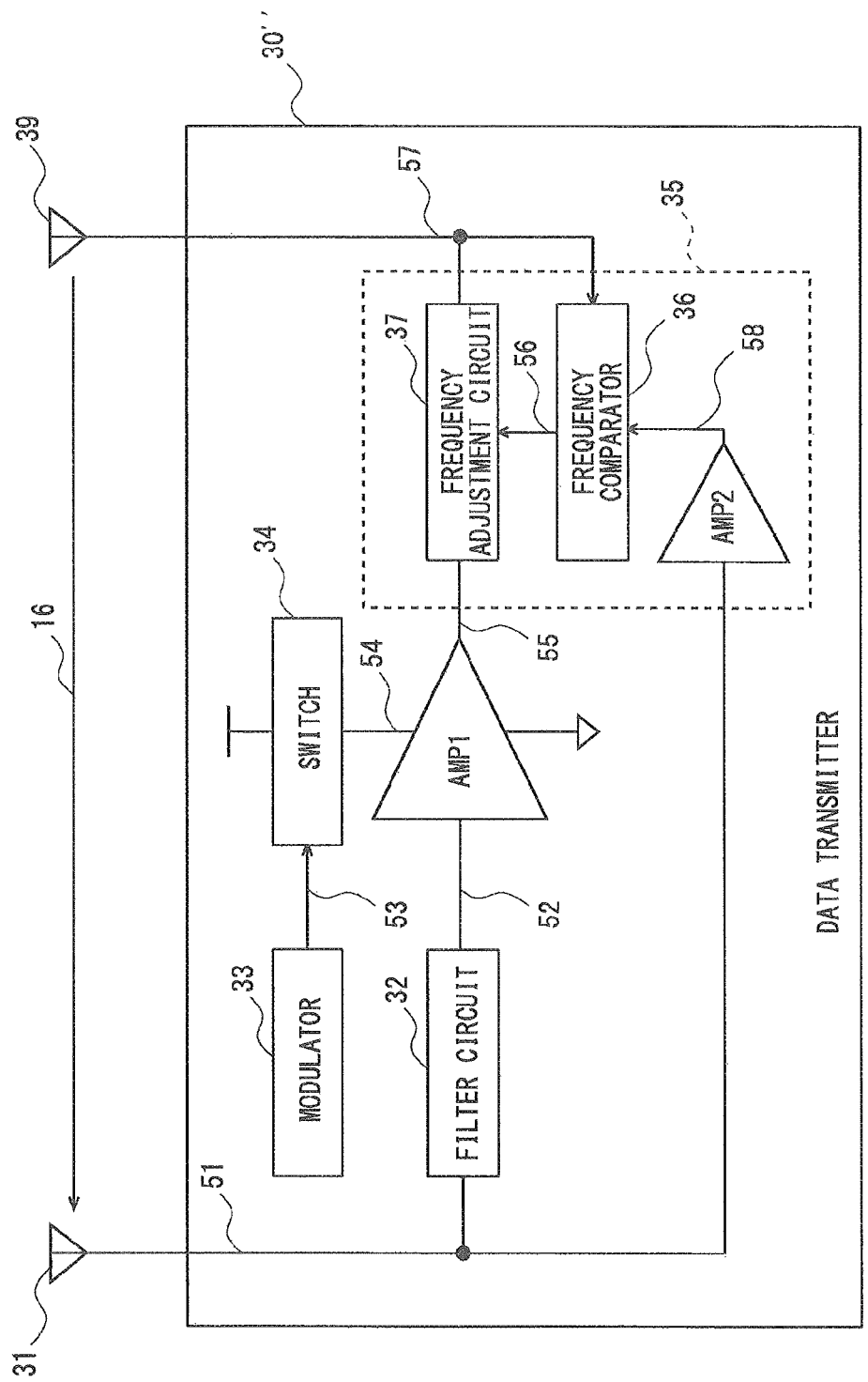
FIG. 17 is a block diagram showing a data transmitter used in a wireless communication system according to a fourth embodiment.

Next, a fourth embodiment shall be explained. FIG. 17 is a block diagram showing a data transmitter 30" included in a wireless communication system according to a fourth embodiment. In the wireless communication system according to this embodiment, a feedback element included in the data transmitter 30" is configured using the first antenna 31 and the second antenna 39, and a feedback loop is formed by transmitting a third radio wave 16 from the second antenna 39 to the first antenna 31. As the configuration of the wireless communication system according to this embodiment other than the above-mentioned configuration is the same as that of the wireless communication systems explained in the first and second embodiments, the same components are denoted by the same reference numerals, and a repeated explanation shall be omitted.

In the data transmitter 30" shown in FIG. 17, a feedback loop is formed by transmitting the third radio wave 16 from the second antenna 39 to the first antenna 31. At this time, the first antenna 31 and the second antenna 39 may be configured in such a way that an orientation direction of the first antenna 31 and an orientation direction of the second antenna 39 overlap. In order to form a feedback loop via a space and generate an oscillation phenomenon, following two conditions, which are a power condition and a phase condition, need to be satisfied.

Figure 18:
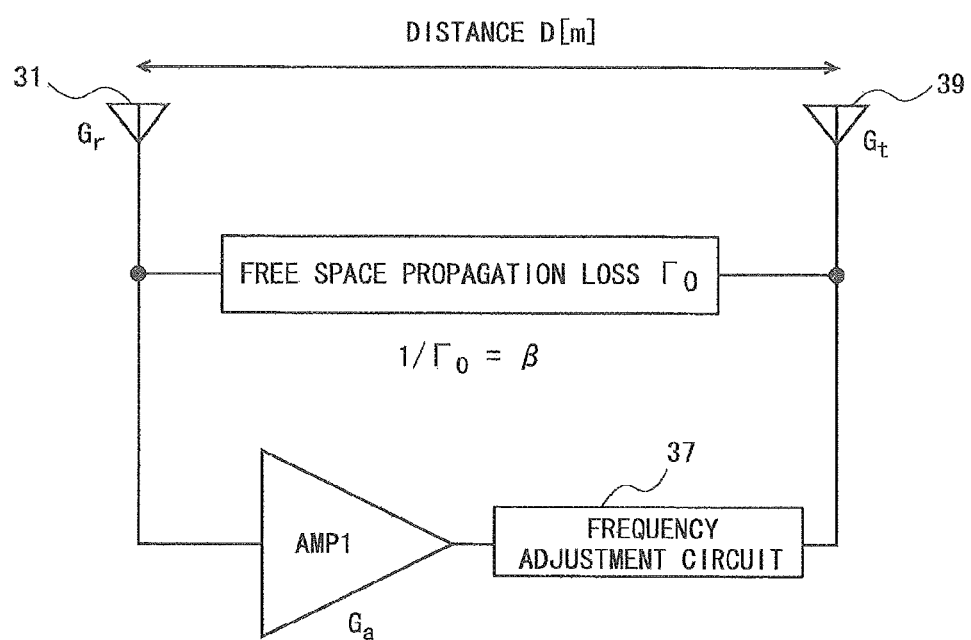
FIG. 18 is a diagram for explaining a power condition for generating an oscillation phenomenon in the data transmitter.

When the third radio wave 16 is transmitted from the second antenna 39 to the first antenna 31, intensity of the third radio wave 16 is reduced by a free space propagation loss. Therefore, when the distance between the first antenna 31 and the second antenna 39 is too large, it is difficult to form the feedback loop. Whether or not the oscillation phenomenon is generated depends also on a phase difference that is generated when the third radio wave 16 propagates through a free space. Firstly, the power condition to generate the oscillation phenomenon shall be explained with reference to FIG. 18.

In order to generate the oscillation phenomenon in the feedback loop, the following expression 4 needs to be satisfied. In this expression, $G_a$ is a power gain of the amplifier AMP1, $G_r$ is an antenna gain of the first antenna 31, $G_t$ is an antenna gain of the second antenna 39, and $\Gamma_0$ is a free space propagation loss when the third radio wave 16 propagates from the second antenna 39 to the first antenna 31.

$$10 \log |G_a| + 10 \log G_t + 10 \log G_r - 10 \log \Gamma_0 \geq 0 \text{ [dB]} \quad \text{Expression 4}$$

The following expression 5 is the expression 4, in which the notation thereof has been changed from logarithm to linear notation.

$$\frac{G_t G_r |G_a|}{\Gamma_0} \geq 1 \quad \text{Expression 5}$$

Further, when the Friis transmission equation is used, the expression 5 can be expressed as in the expression 6.

$$G_t G_r |G_a| \cdot \left(\frac{c}{4\pi D f}\right)^2 \geq 1 \quad \text{Expression 6}$$

In this expression, D is the distance between the first antenna 31 and the second antenna 39, and f is a frequency of the third radio wave 16 (in other words, the frequency in the feedback loop). Suppose that the amplifier AMP1 is a primary delay system, a DC gain of the amplifier AMP1 is $G_{a0}$, and a frequency band width of the amplifier AMP1 is $f_p$, the inter-antenna distance D needs to satisfy the following Expression 7. In this expression, c is a speed of light.

$$D \leq \frac{c\sqrt{G_t G_r G_{a0}}}{4\pi f \cdot [1 + (f/f_p)^2]^{1/4}} \text{ [m]} \quad \text{Expression 7}$$

Figure 19:
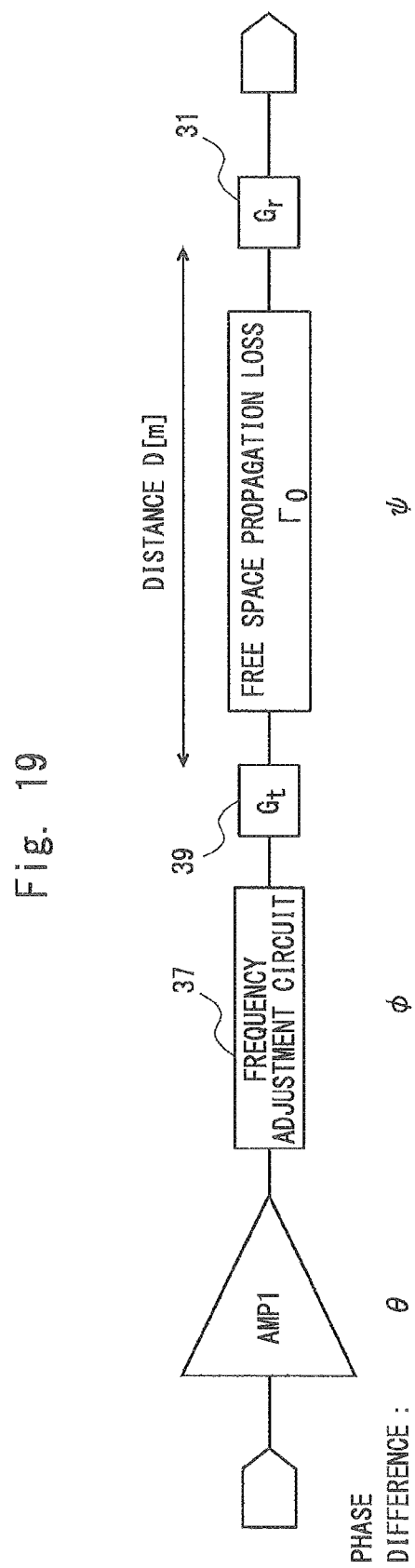
FIG. 19 is a diagram for explaining a phase condition for generating the oscillation phenomenon in the data transmitter.

Next, the phase condition to generate the oscillation phenomenon shall be explained with reference to FIG. 19. When a phase delay in the amplifier AMP is $\theta$, a phase delay in the frequency adjustment circuit (the phase adjustment circuit) 37 is $\phi$, and a phase delay in the free space propagation is $\psi$, the following expression 8 needs to be satisfied as the phase condition to generate oscillation. In this expression, N is an integer.

$$\theta + \phi + \psi = 2\pi \cdot N \quad \text{Expression 8}$$

Suppose that the amplifier AMP1 is a primary delay system, the expression 9 can be derived in consideration of the phase delay by the propagation through the distance D.

$$-\tan^{-1}(f/f_p) + \phi + 2\pi \cdot \frac{Df}{c} = 2\pi \cdot N \quad \text{Expression 9}$$

When N=1, the phase difference $\phi$ in the frequency adjustment circuit 37 needs to satisfy the following Expression 10.

$$\phi = 2\pi \cdot \left(1 - \frac{Df}{c}\right) + \tan^{-1}(f/f_p) \text{[rad]} \quad \text{Expression 10}$$

Further, the following expression 11 can be derived when a condition for the amplifier AMP1 to perform the full swing operation is derived.

$$D = \frac{c}{4\pi f \sqrt{\Gamma_0}} = \frac{c}{4\pi f \sqrt{1/\beta}} \text{ [m]} \quad \text{Expression 11}$$

Figure 20:
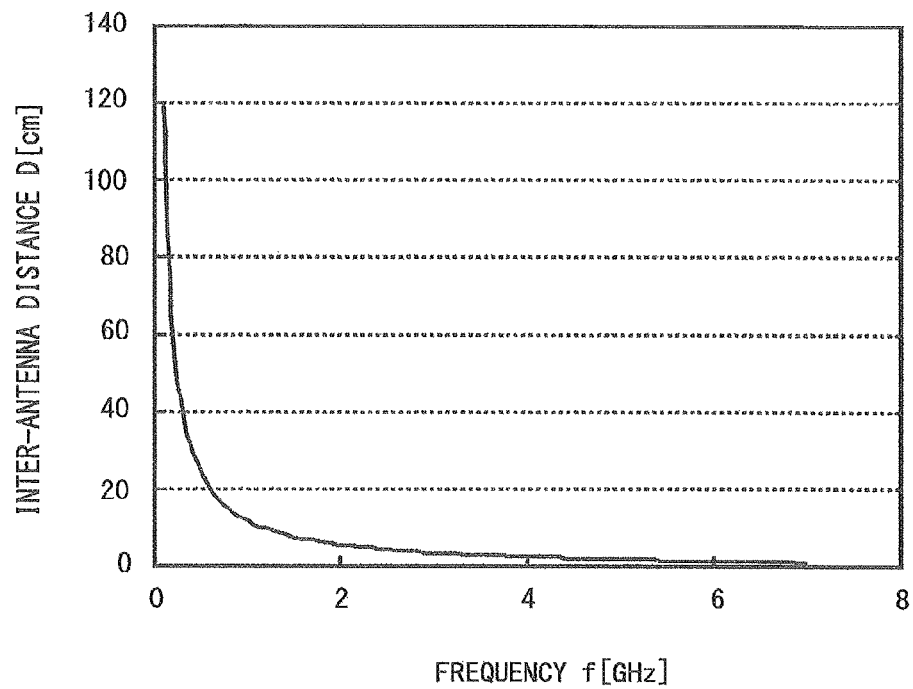
FIG. 20 is a diagram showing a relationship between an oscillation frequency f[GHz] and an inter-antenna distance D[cm]
Figure 21:
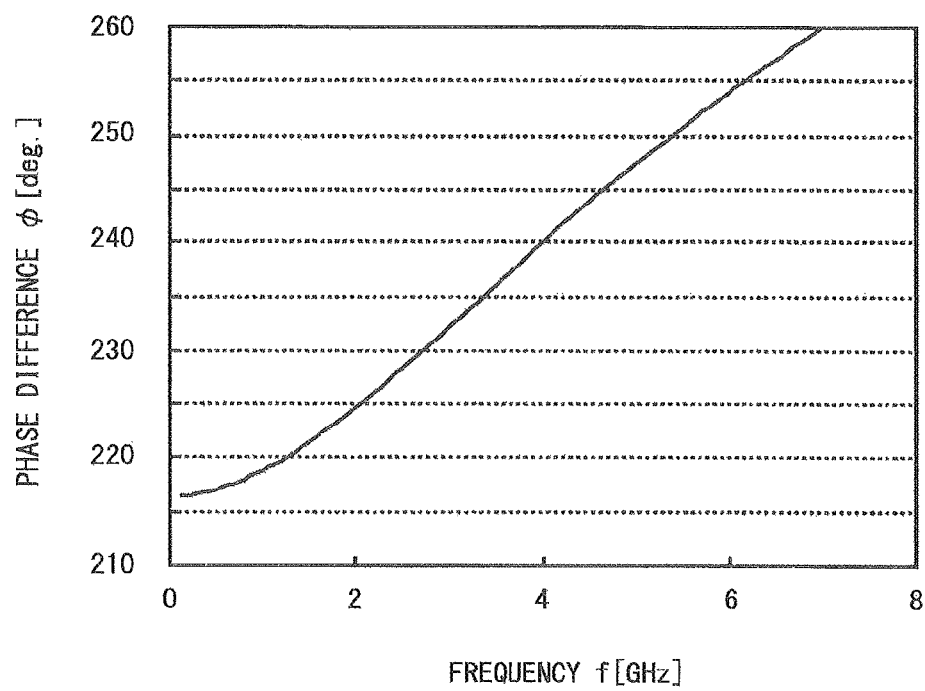
FIG. 21 is a diagram showing a relationship between the oscillation frequency f[GHz] and a phase difference φ[deg.]

FIG. 20 is a diagram showing a plot of a relationship between the inter-antenna distance D and the frequency f (Expression 7), where the speed of light $c=3\times10^8$ [m/s], the antenna gain $G_t=G_r=2$ [dBi], the DC gain of the amplifier AMP1 $G_{a0}=10$ [dB], and the frequency band width of the amplifier AMP1 $f_p=4$ [GHz]. Further, FIG. 21 is a diagram showing a plot of a relationship between the phase difference $\phi$ and the frequency f in the frequency adjustment circuit 37 (Expression 10).

For example, in order to generate the oscillation phenomenon at the frequency=2.4 [GHz], the inter-antenna distance D is D≤4.6 [cm], and the phase difference $\phi$ in the frequency adjustment circuit 37 is $\phi=228°$ (which is a value where D=4.6 [cm]). Moreover, a condition for performing the full swing operation is D=3.2 [cm] and $\phi=270°$ (which is a value where D=3.2 [cm])

Fifth Embodiment

Figure 22:
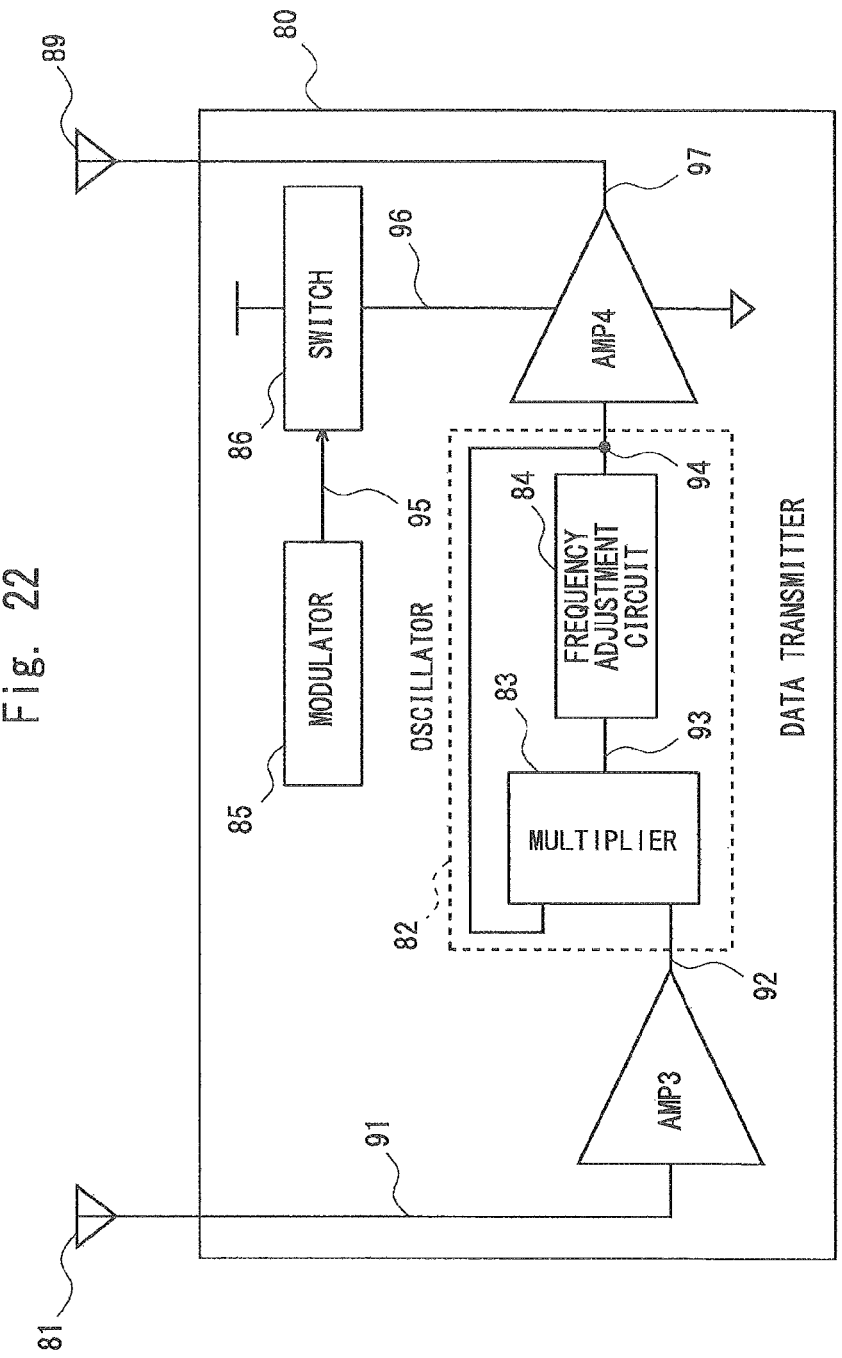
FIG. 22 is a block diagram showing a data transmitter used in a wireless communication system according to a fifth embodiment.

Next, a fifth embodiment shall be explained. FIG. 22 is a block diagram showing a data transmitter 80 included in a wireless communication system according to the fifth embodiment. A configuration of the data transmitter 80 in the wireless communication according to this embodiment is different from that of the data transmitters in the first to fourth embodiments. A configuration of the wireless communication system other than the above-mentioned configuration, that is, the configuration and operation of the first radio equipment 10 and the second radio equipment 30, is the same as that of the wireless communication systems according to the first to fourth embodiments.

As shown in FIG. 22, the data transmitter 80 includes a first antenna 81, an amplifier AMP3 (an input amplifier), an oscillator 82, an amplifier AMP4 (an output amplifier), a modulator 85, a switch 86, and a second antenna 89. The oscillator 82 includes a multiplier 83 and a frequency adjustment circuit 84.

The first antenna 81 receives the first radio wave 14 that is transmitted from the first radio equipment 10, and outputs a signal 91 corresponding to the first radio wave that is received by the first antenna 81 (i.e., the signal is a reception signal) to the amplifier AMP3.

The amplifier AMP3 amplifies the signal 91, and outputs an amplified signal 92 to the oscillator 82. The oscillator 82 oscillates at the same frequency as the frequency of the first radio wave 14 (in other words, a frequency of the amplified signal 92), and outputs a signal 94 that is output from the oscillator 82 to the amplifier AMP4. As the amplified signal 92 is supplied to the oscillator 82 at this time, a phenomenon called injection locking, in which the oscillation frequency of the oscillator 82 precisely follows the frequency of the first radio wave 14, occurs.

The multiplier 83 included in the oscillator 82 inputs the amplified signal 92 and the signal 94, and outputs a signal 93, which is obtained by multiplying the signals 92 and 94, to the frequency adjustment circuit 84. The frequency adjustment circuit 84 adjusts a frequency of the signal 93 so that the oscillation frequency of the oscillator 82 matches the frequency of the first radio wave 14, and outputs the adjusted signal 94. In other words, the frequency adjustment circuit 84 adjusts the frequency of the signal 93 so that the frequency of the signal 92 that is supplied to the multiplier 83 matches a frequency of the signal 94.

Figure 23:
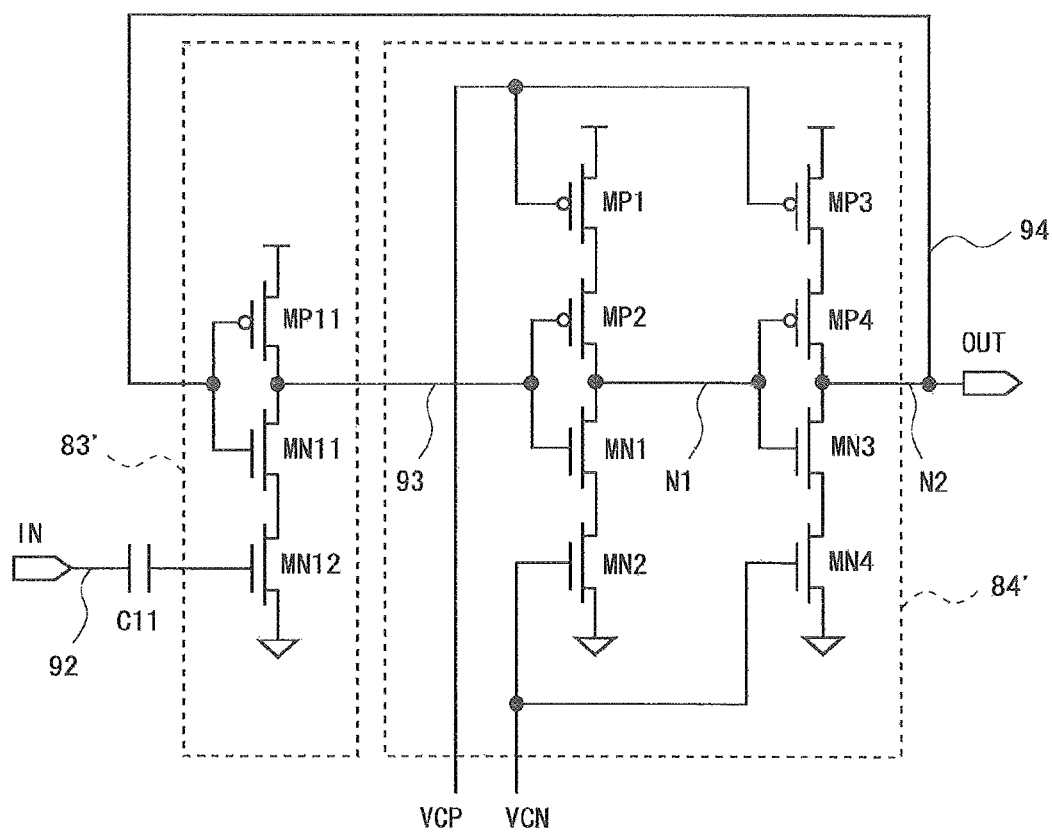
FIG. 23 is a circuit diagram showing an example of an oscillator included in the data transmitter shown in FIG. 22.

FIG. 23 is a circuit diagram showing an example of the multiplier 83 and the frequency adjustment circuit 84 that are included in the oscillator 82. As shown in FIG. 23, a multiplier 83' includes a P-type transistor MP11 and N-type transistors MN11 and MN12. A frequency adjustment circuit 84' includes P-type transistors MP1 to MP4 and N-type transistors MN1 to MN4. Note that as the frequency adjustment circuit 84' is the same as the frequency adjustment circuit 37' that has been explained using FIG. 7, the same components are denoted by the same reference numerals, and a repeated explanation shall be omitted.

As for the P-type transistor MP11 included in the multiplier 83', the source is connected to the power supply, the drain is connected to the drain of the N-type transistor MN11, and the signal 94 is supplied to the gate. As for the N-type transistor MN11, the drain is connected to the drain of the P-type transistor MP11, the source is connected to the drain of the N-type transistor MN12, and the signal 94 is supplied to the gate. That is, the P-type transistor MP11 and the N-type transistor MN11 constitute an inverter. As for the N-type transistor MN12, the drain is connected to the source of the N-type transistor MN11, the source is connected to the ground, and the signal 92 is supplied to the gate via the capacitor C11.

When both of the signals 92 and 94 are high levels, the P-type transistor MP11 is turned on, the N-type transistor MN11 is turned on, the N-type transistor MN12 is turned on, and a low level signal is output as the signal 93. Meanwhile, when both of the signals 92 and 94 are low levels, the P-type transistor MP11 is turned on, the N-type transistor MN11 is turned off, the N-type transistor MN12 is turned off, and a high level signal is output as the signal 93.

That is, when the frequency of the signal 92 matches the frequency of the signal 94, the multiplier 83' outputs the signal 93 that is synchronized with the signals 92 and 94. The frequency adjustment circuit 84' adjusts the frequency of the signal 93 so that the frequencies of the signals 92 and 94 match.

Figure 24:
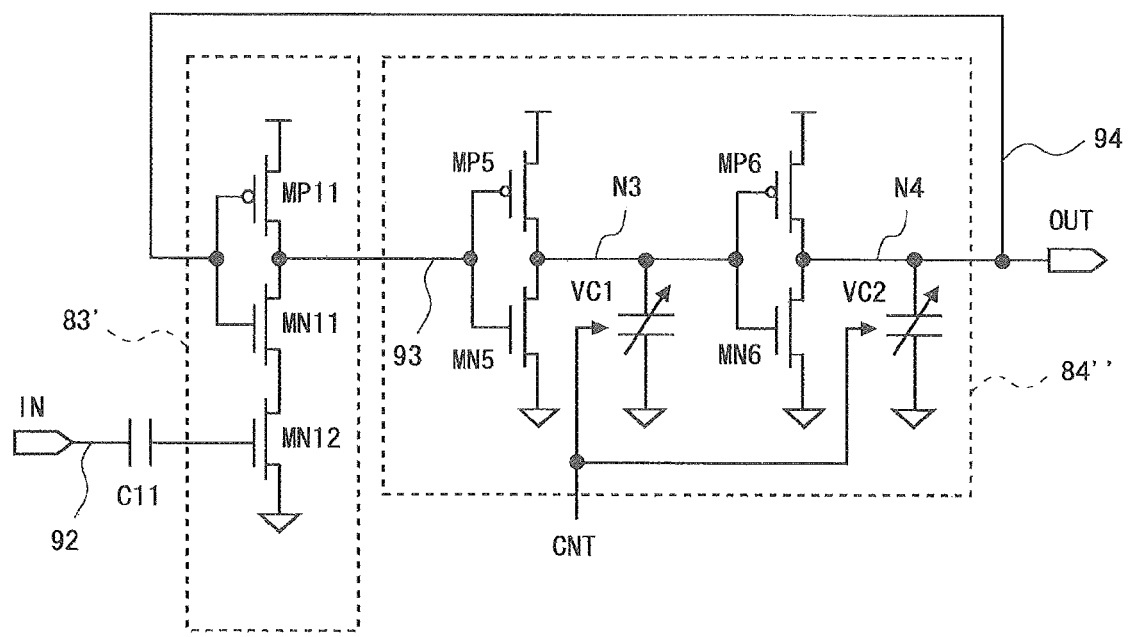
FIG. 24 is a circuit diagram showing an example of the oscillator included in the data transmitter shown in FIG. 22.

FIG. 24 is a circuit diagram showing an example of the multiplier 83 and the frequency adjustment circuit 84 that are included in the oscillator 82. As shown in FIG. 24, the oscillator 82 may be configured using the multiplier 83' and a frequency adjustment circuit 84". The multiplier 83' includes a P-type transistor MP11, and N-type transistors MN11 and MN12. The frequency adjustment circuit 84" includes P-type transistors MP5 and MP6, N-type transistors MN5 and MN6, and variable capacitors VC1 and VC2. Note that the multiplier 83' is the same as the multiplier 83' that has been explained using FIG. 23, and the frequency adjustment circuit 84" is the same as the frequency adjustment circuit 37" that has been explained using FIG. 7, thus the same components are denoted by the same reference numerals, and a repeated explanation shall be omitted.

In the oscillator shown in FIG. 24, when the frequencies of the signals 92 and 94 match, the multiplier 83' outputs the signal 93 that is synchronized with the signals 92 and 94. The frequency adjustment circuit 84" adjusts the frequency of the signal 93 so that the frequencies of the signals 92 and 94 match.

The amplifier AMP4 shown in FIG. 22 amplifies the signal 94 that is output from the oscillator 82, and outputs an amplified signal 97 to the second antenna 89. The second antenna 89 transmits the signal 97 as the second radio wave 15. A power supply 96 is supplied to the amplifier AMP4 via the switch 86. The switch 86 turns on and off the power supply 96 that is supplied to the amplifier AMP4 according to a control signal 95 that is output from the modulator 85. The modulator 85 generates the control signal 95 according to the second data to be transmitted. That is, it is possible to switch between a state where the amplified signal 97 is output from the amplifier AMP4 and a state where the amplified signal 97 is not output from the amplifier AMP4, according to the second data.

For example, when the second data to be transmitted is "1", the modulator 85 outputs the control signal 95 that turns on the switch 86. In this case, as the switch 86 is turned on, the power supply 96 is supplied to the amplifier AMP4. The amplifier AMP4 outputs the signal 97, which is the amplified signal 94 (i.e., the signal 97 corresponds to the second data "1"). At this time, the second radio wave 15 is transmitted from the second antenna 89.

Meanwhile, when the second data to be transmitted is "0", the modulator 85 outputs the control signal 95 that turns off the switch 86. In this case, as the switch 86 is turned off, the power supply 96 is not supplied to the amplifier AMP4. Thus, the low-level signal 97 (which corresponds to the second data "0") is output from the amplifier AMP4. At this time, the second radio wave 15 is not transmitted from the second antenna 89.

Note that the second data transmitted from the data transmitter 80 is the same as the one explained in the first embodiment.

Also in this embodiment, the second data transmitted from the data transmitter 80 is transmitted using a variation in the bit error rate of the radio waves (the first and second radio waves) that are received by the second radio equipment 20. In this embodiment, the oscillator 82 that oscillates at the same frequency as the frequency of the first radio wave 14 is provided in the data transmitter 80. It is thus possible to eliminate the frequency comparator included in the data transmitters explained in the first and fourth embodiments, thereby further reducing the power consumption of the data transmitter.

Note that also in this embodiment, the first data that is transmitted from the first radio equipment 10 to the second radio equipment 20 may be a fixed data pattern (see the second embodiment).

Sixth Embodiment

Figure 25:
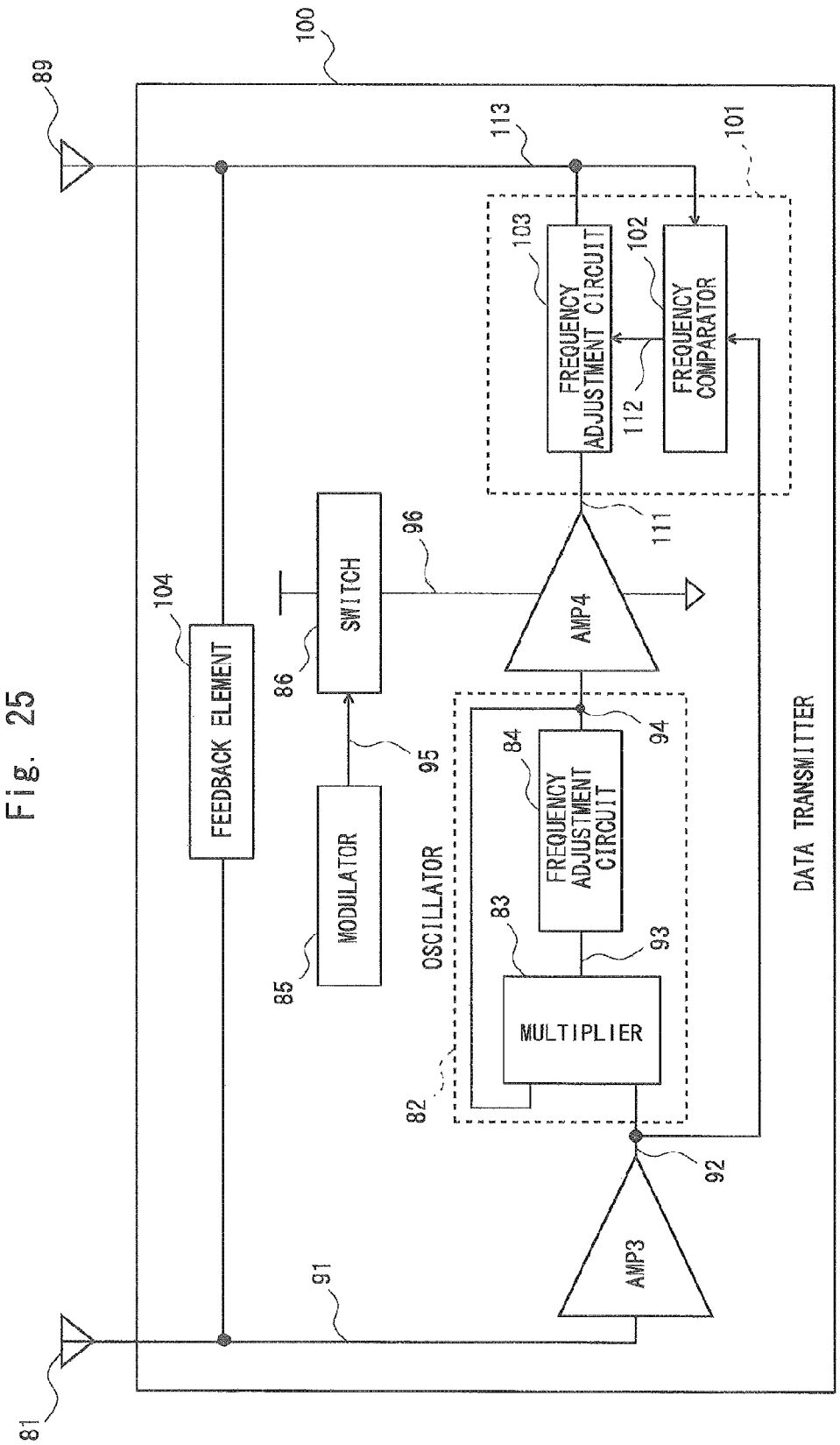
FIG. 25 is a block diagram showing a data transmitter used in a wireless communication system according to a sixth embodiment.

Next, a sixth embodiment shall be explained. FIG. 25 is a block diagram showing a data transmitter 100 included in a radio communication system according to the sixth embodiment. In this embodiment, the data transmitter explained in the fifth embodiment further includes a feedback element 104 and an oscillation frequency adjustment circuit 101. As a configuration of the data transmitter according to this embodiment other than the above-mentioned configuration is the same as the data transmitter explained in the fifth embodiment, the same components are denoted by the same reference numerals, and a repeated explanation shall be omitted.

As shown in FIG. 25, the data transmitter 100 includes the first antenna 81, the amplifier AMP3, the oscillator 82, the amplifier AMP4, the modulator 85, the switch 86, the oscillation frequency adjustment circuit 101, the feedback element 104, and the second antenna 89. The oscillator 82 includes the multiplier 83 and the frequency adjustment circuit 84. The oscillation frequency adjustment circuit 101 includes a frequency comparator 102 and a frequency adjustment circuit 103.

The feedback element 104 feedbacks a signal from an output node of the amplifier AMP4 to an input node of the amplifier AMP4 (which is positive feedback), and forms a feedback loop. The frequency comparator 102 compares a signal 113 that is output from the frequency adjustment circuit 103 with the signal 92 that is amplified by the amplifier AMP3, and controls the frequency adjustment circuit 103 according to a result of the comparison. Specifically, the frequency comparator 102 controls the frequency adjustment circuit 103 so that a frequency of the signal 113 that is output from the frequency adjustment circuit 103 matches the frequency of the signal 92 that is amplified by the amplifier AMP3. Note that the frequency comparator 102 and the frequency adjustment circuit 103 are the same as the frequency comparator 36 and the frequency adjustment circuit 37, respectively, that are explained in the first embodiment.

In this embodiment, as the feedback element 104 is provided, two feedback loops (which are a loop passing through the feedback element 104 and a feedback loop of the oscillator 82) are formed in the data transmitter 100. It is therefore possible to reduce the gains of the amplifiers AMP3 and AMP4 inside the data transmitter 100, thereby reducing the power consumption of the amplifiers AMP3 and AMP4.

Figure 26:
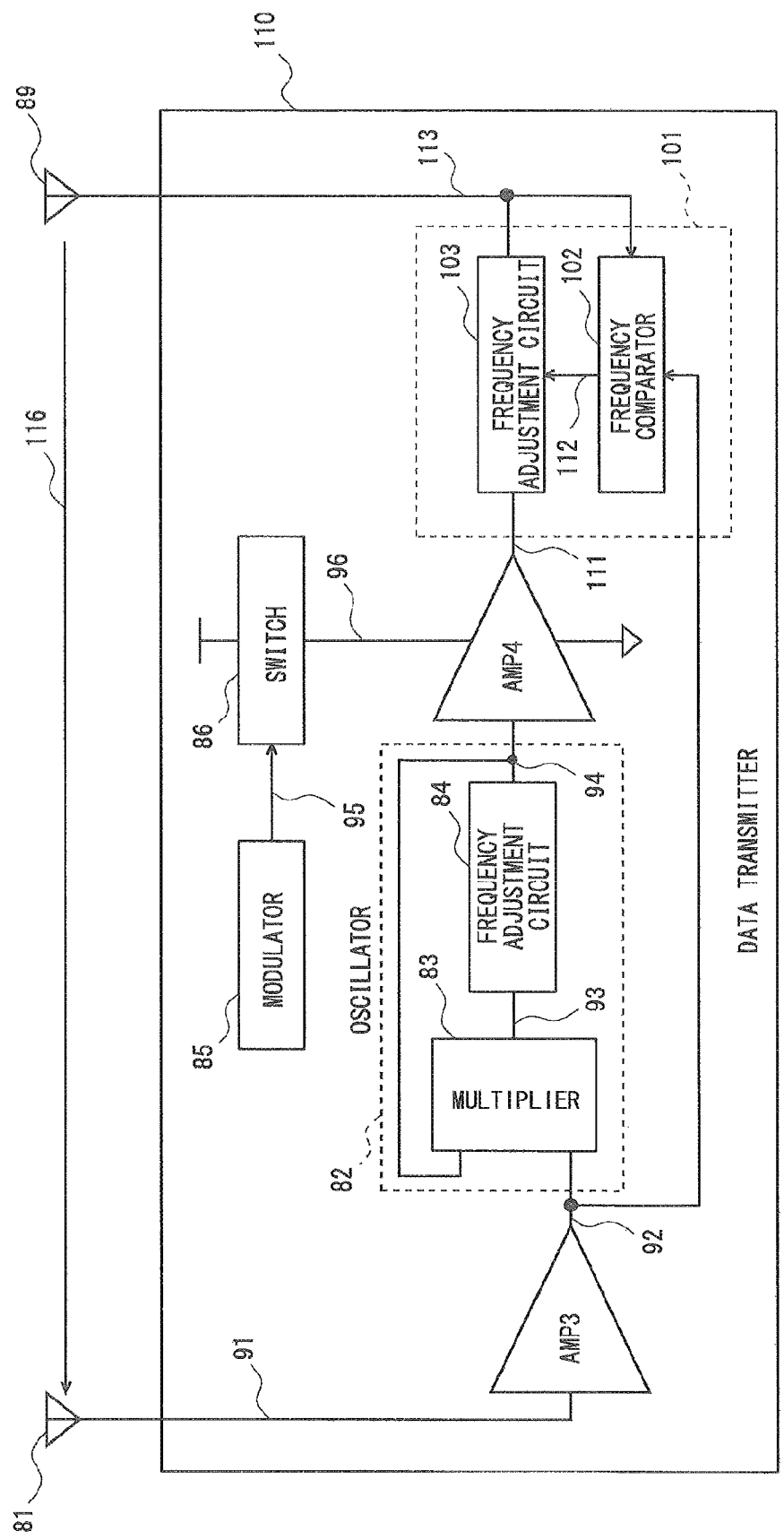
FIG. 26 is a block diagram showing the data transmitter used in the wireless communication system according to the sixth embodiment.

Note that in this embodiment, the feedback elements explained in the first and third embodiments may be used as the feedback element 104. Further, as in the data transmitter 110 shown in FIG. 26, the feedback loop may be formed by transmitting a third radio wave 116 from the second antenna 89 to the first antenna 81 (see the fourth embodiment). Moreover, also in this embodiment, the first data that is transmitted from the first radio equipment 10 to the second radio equipment 20 may be a fixed data pattern (see the second embodiment).

Seventh Embodiment

Figure 27:
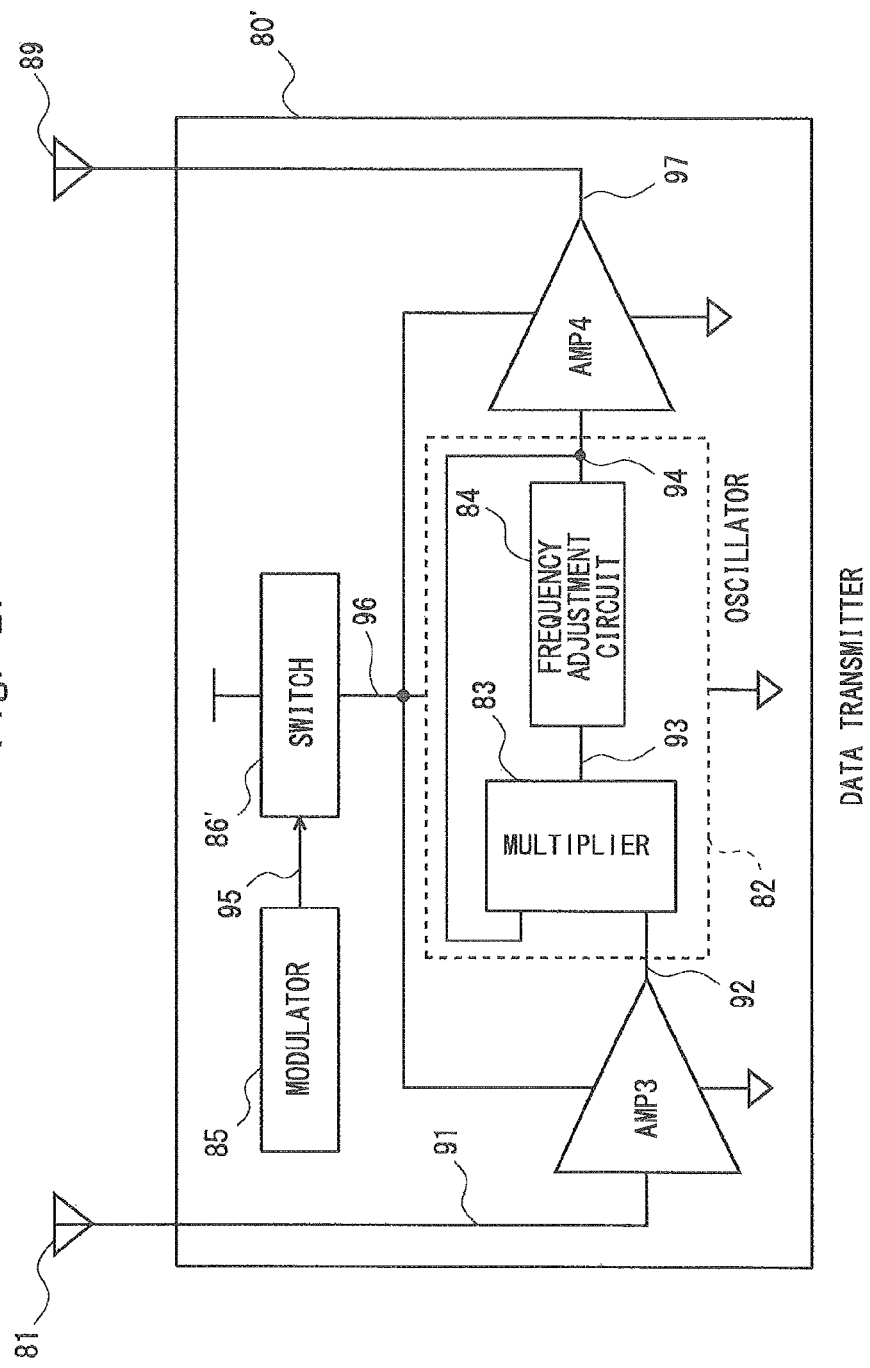
FIG. 27 is a block diagram showing a data transmitter used in a wireless communication system according to a seventh embodiment.

Next, a seventh embodiment shall be explained. FIG. 27 is a block diagram showing a data transmitter 80' included in a wireless communication system according to the seventh embodiment. The data transmitter 80' according to this embodiment is different from the data transmitter 80 explained in the fifth embodiment in that the data transmitter 80' according to this embodiment switches the power supply that is supplied to the input amplifier AMP3, the oscillator 82, the output amplifier AMP4 using a switch 86'. As a configuration of the data transmitter 80' according to this embodiment other than the above-mentioned configuration is the same as the data transmitter 80 explained in the fifth embodiment, the same components are denoted by the same reference numerals, and a repeated explanation shall be omitted.

As shown in FIG. 27, the data transmitter 80' includes the first antenna 81, the input amplifier AMP3, the oscillator 82, the output amplifier AMP4, the modulator 85, the switch 86', and the second antenna 89. The oscillator 82 includes the multiplier 83 and the frequency adjustment circuit 84.

The power supply 96 is supplied to the input amplifier AMP3, the oscillator 82, and the output amplifier AMP4 via the switch 86'. The switch 86' turns on and off the power supply 96 that is supplied to the input amplifier AMP3, the oscillator 82, and the output amplifier AMP4 according to the control signal 95 that is output from the modulator 85. The modulator 85 generates the control signal 95 according to the second data to be transmitted. That is, in the data transmitter 80' shown in FIG. 27, by turning on and off the power supply that is supplied to the input amplifier AMP3, the oscillator 82, and the output amplifier AMP4 according to the second data, the second radio wave transmitted from the second antenna 89 is modulated.

For example, when the second data to be transmitted is "1", the modulator 85 outputs the control signal 95 for turning on the switch 86'. In this case, as the switch 86' is turned on, the power supply 96 is supplied to the input amplifier AMP3, the oscillator 82, and the output amplifier AMP4. At this time, the second radio wave 15 is transmitted from the second antenna 89.

Meanwhile, when the second data to be transmitted is "0", the modulator 85 outputs the control signal 95 for turning off the switch 86'. In this case, as the switch 86' is switched off, the power supply 96 is not supplied to the input amplifier AMP3, the oscillator 82, and the output amplifier AMP4. At this time, the second radio wave 15 is not transmitted from the second antenna 89.

Note that the second data transmitted from the data transmitter 80' is the same as the second data explained in the first embodiment.

Eighth Embodiment

Next, an eighth embodiment shall be explained. Although the first to seventh embodiments explained a configuration in which the data transmitter includes two antennas (the first and the second antennas), this embodiment explains a configuration in which a data transmitter includes one antenna.

Figure 28:
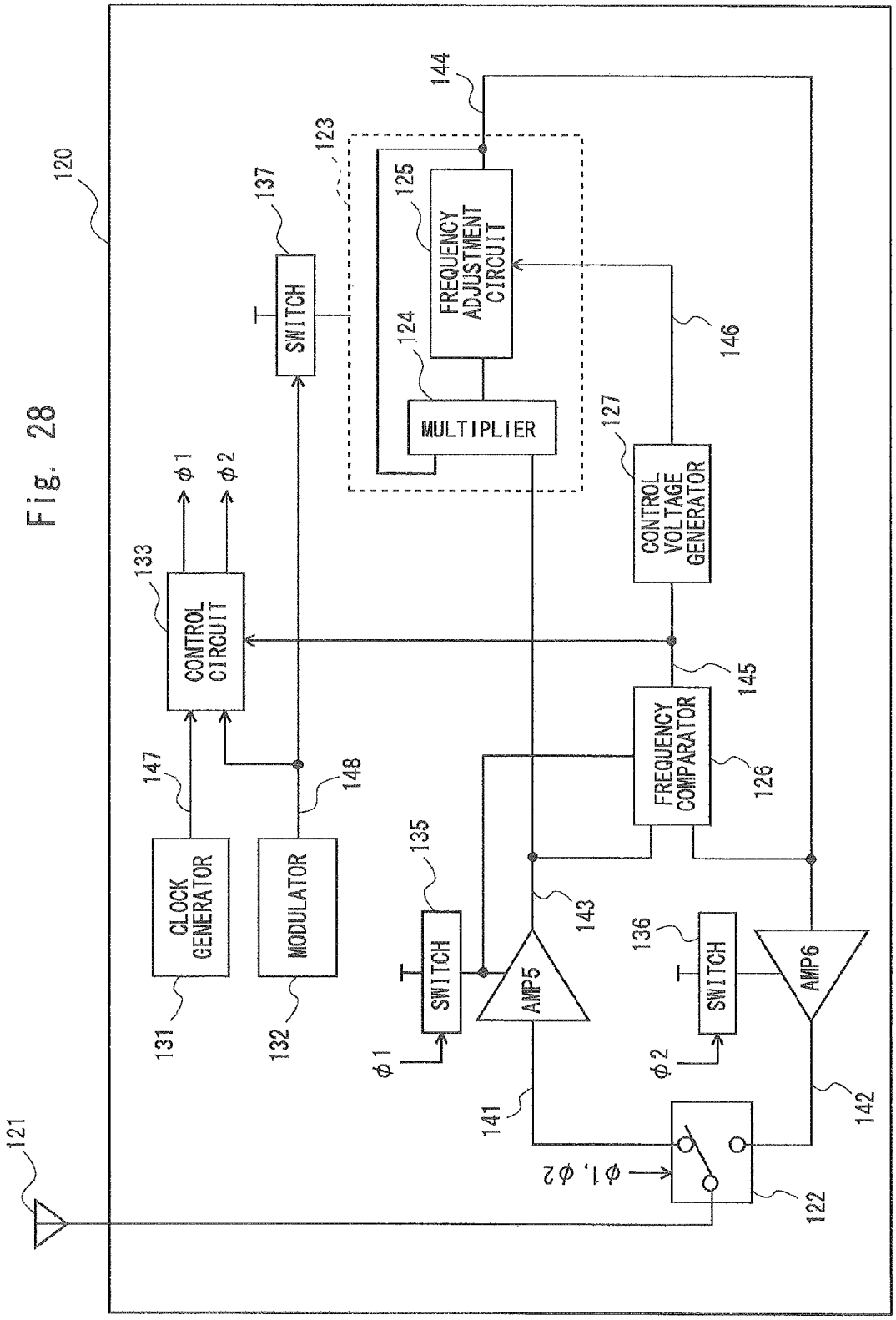
FIG. 28 is a block diagram showing a data transmitter used in a wireless communication system according to an eighth embodiment.

FIG. 28 is a block diagram showing a data transmitter 120 included in a wireless communication system according to this embodiment. As shown in FIG. 28, the data transmitter 120 includes an antenna 121, an input/output switching circuit 122, an input amplifier AMP5, an oscillator 123, an output amplifier AMP6, a frequency comparator 126, a control generator 127, a clock generator 131, a modulator 132, a control circuit 133, and switches 135 to 137. The oscillator 123 includes a multiplier 124 and a frequency adjustment circuit 125.

The antenna 121 receives the first radio wave 14 that is transmitted from the first radio equipment 10 (see FIG. 1), and transmits the second radio wave 15 (which causes a disturbance on the first radio wave 13) that has been modulated according to the second data to be transmitted.

The input/output switching circuit 122 switches between a connection that is between an input node of the input amplifier AMP5 and the antenna 121 and a connection that is between an output node of the output amplifier AMP6 and the antenna 121. The input/output switching circuit 122 is controlled by control signals $\phi 1$ and $\phi 2$ that are output from the control circuit 133. That is, when the high-level control signal $\phi 1$ is supplied, the input/output switching circuit 122 connects the input node of the input amplifier AMP5 to the antenna 121, while when the high-level control signal $\phi 2$ is supplied, the input/output switching circuit 122 connects the output node of the output amplifier AMP6 to the antenna 121.

The input amplifier AMP5 amplifies a signal 141 that corresponds to the first radio wave 14 (see FIG. 1) that is received by the antenna 121, and outputs an amplified signal 143 to the oscillator 123 and the frequency comparator 126. That is, when the input/output switching circuit 122 connects the input node of the input amplifier AMP5 to the antenna 121, the signal 141 that corresponds to the first radio wave is supplied to the input amplifier AMP5. The input amplifier AMP5 amplifies the signal 141, and outputs the amplified signal 143 to the oscillator 123 and the frequency comparator 126.

The oscillator 123 oscillates at the same frequency as the frequency of the first radio wave (in other words, a frequency of the amplified signal 143), and outputs a signal 144 that is output from the oscillator 123 to the output amplifier AMP6 and the frequency comparator 126. The multiplier 124 included in the oscillator 123 inputs the amplified signal 143 and the signal 144, and outputs a signal obtained by multiplying the signals 143 and 144 to the frequency adjustment circuit 125. The frequency adjustment circuit 125 adjusts a frequency of a signal output from the multiplier 124 so that an oscillation frequency of the oscillator 123 matches the frequency of the first radio wave 14, and outputs the adjusted signal 144. In other words, the frequency adjustment circuit 125 adjusts a frequency of a signal that has been input to the frequency adjustment circuit 125 so that the frequency of the signal 143 that has been input to the multiplier 124 matches the frequency of the signal 144. The frequency of the signal 144 that is output from the frequency adjustment circuit 125 is controlled using a control voltage 146 that is supplied from the control voltage generator 127. When the oscillation frequency of the oscillator 123 matches the frequency of the first radio wave 14, injection locking occurs.

The oscillator 123 can be configured using, for example, the multiplier 83' and the frequency adjustment circuit 84' that are shown in FIG. 23. The control voltage 146 corresponds to the control voltages VCP and VCN of the frequency adjustment circuit 84' shown in FIG. 23. Note that as a configuration and operation of the multiplier 83' and the frequency adjustment circuit 84' have already been explained in the first embodiment (see FIG. 7) and the fifth embodiment (see FIG. 23), a repeated explanation shall be omitted. Further, the oscillator 123 may be configured using, for example, the multiplier 83' and the frequency adjustment circuit 84" that are shown in FIG. 24 (in this case, the control signal CNT of the frequency adjustment circuit 84" shown in FIG. 24 corresponds to the control voltage 146 in FIG. 28).

The frequency comparator 126 compares the frequency of the signal 143 that has been output from the input amplifier AMP5 with the frequency of the signal 144 that has been output from the oscillator 123. When the frequency of the signal 143 matches the frequency of the signal 144, the frequency comparator 126 outputs a high level signal to the control circuit 133 and the control voltage generator 127.

The control voltage generator 127 generates the control voltage 146 for controlling the frequency adjustment circuit 125. The control voltage generator 127 sweeps the control voltage 146, changes the frequency of the output signal 144 from the oscillator 123, and fixes the control voltage 146 at a timing when the frequency of the output signal 144 from the oscillator 123 matches the frequency of the output signal 143. At this time, the control voltage generator 127 can recognize the timing when the frequency of the output signal 144 from the oscillator 123 matches the frequency of the output signal 143 from the input amplifier AMP5 by the detection signal 145 that is supplied by the frequency comparator 126.

The output amplifier AMP6 amplifies the signal 144 output from the oscillator 123, and outputs an amplified signal 142 to the antenna 121. That is, when the input/output switching circuit 122 connects the output node of the output amplifier AMP6 to the antenna 121, the signal 142 that is amplified by the output amplifier AMP6 is supplied to the antenna 121, and the antenna 121 transmits the signal 142 as the second radio wave 15 (see FIG. 1).

The switch 135 switches whether or not to supply power to the input amplifier AMP5 and the frequency comparator 126 according to the control signal φ1 that is output from the control circuit 133. For example, when the control signal φ1 is a high level, the switch 135 supplies the power to the input amplifier AMP5 and the frequency comparator 126, while when the control signal φ1 is a low level, the switch 135 operates to supply no power to the input amplifier AMP5 and the frequency comparator 126. In other words, the switch 135 supplies the power to the input amplifier AMP5 and the frequency comparator 126 while the input node of the input amplifier AMP5 is connected to the antenna 121 (i.e., while the control signal φ1 is a high level).

The switch 136 switches whether or not to supply the power to the output amplifier AMP6 according to the control signal φ2 that is output from the control circuit 133. For example, when the control signal φ2 is a high level, the switch 136 supplies the power to the output amplifier AMP6, while when the control signal φ2 is a low level, the switch 136 operates to supply no power to the output amplifier AMP6. In other words, the switch 136 supplies the power to the output amplifier AMP6 while the output node of the output amplifier AMP6 is connected to the antenna 121 (i.e., while the control signal φ2 is a high level).

The switch 137 turns on and off the power supply to the oscillator 123 according to second data (transmission data) 148. For example, when the second data 148 output from the modulator 132 is "1", the switch 137 is turned on, and the power is supplied to the oscillator 123. Meanwhile, when the second data 148 output from the modulator 132 is "0", the switch 137 is turned off, and the power is not supplied to the oscillator 123.

The clock generator 131 generates a clock signal, and outputs a generated clock signal 147 to the control circuit 133.

The modulator 132 outputs the second data 148 transmitted by the data transmitter 120 to the control circuit 133 and the switch 137. Note that the second data 148 transmitted by the data transmitter 120 is the same as the second data that has been explained in the first embodiment.

The control circuit 133 generates the control signals φ1 and φ2 for controlling the input/output switching circuit 122 and the switches 135 and 136 according to the detection signal 145, the clock signal 147, and the second data 148. Specifically, when the second data 148 to be transmitted is "1", the control circuit 133 generates a high level signal as the control signal φ1. Then, the input node of the input amplifier AMP5 is connected to the antenna 121. Further, as the switch 135 is turned on, the power is supplied to the input amplifier AMP5 and the frequency comparator 126. Moreover, when the second data 148 to be transmitted is "1", the switch 137 is turned on, thus the power is supplied to the oscillator 123.

After that, when the frequency of the output signal 144 from the oscillator 123 matches the frequency of the output signal 143 from the input amplifier AMP5, the detection signal 145 becomes a high level, and the control circuit 133 outputs a low level signal as the control signal φ1 and a high level signal as the control signal φ2. Thus, the output node of the output amplifier AMP6 is connected to the antenna 121. Further, as the switch 136 is turned on, the power is supplied to the output amplifier AMP6. At this time, as the switch 135 is turned off, the power is not supplied to the input amplifier AMP5 and the frequency comparator 126.

Figure 29:
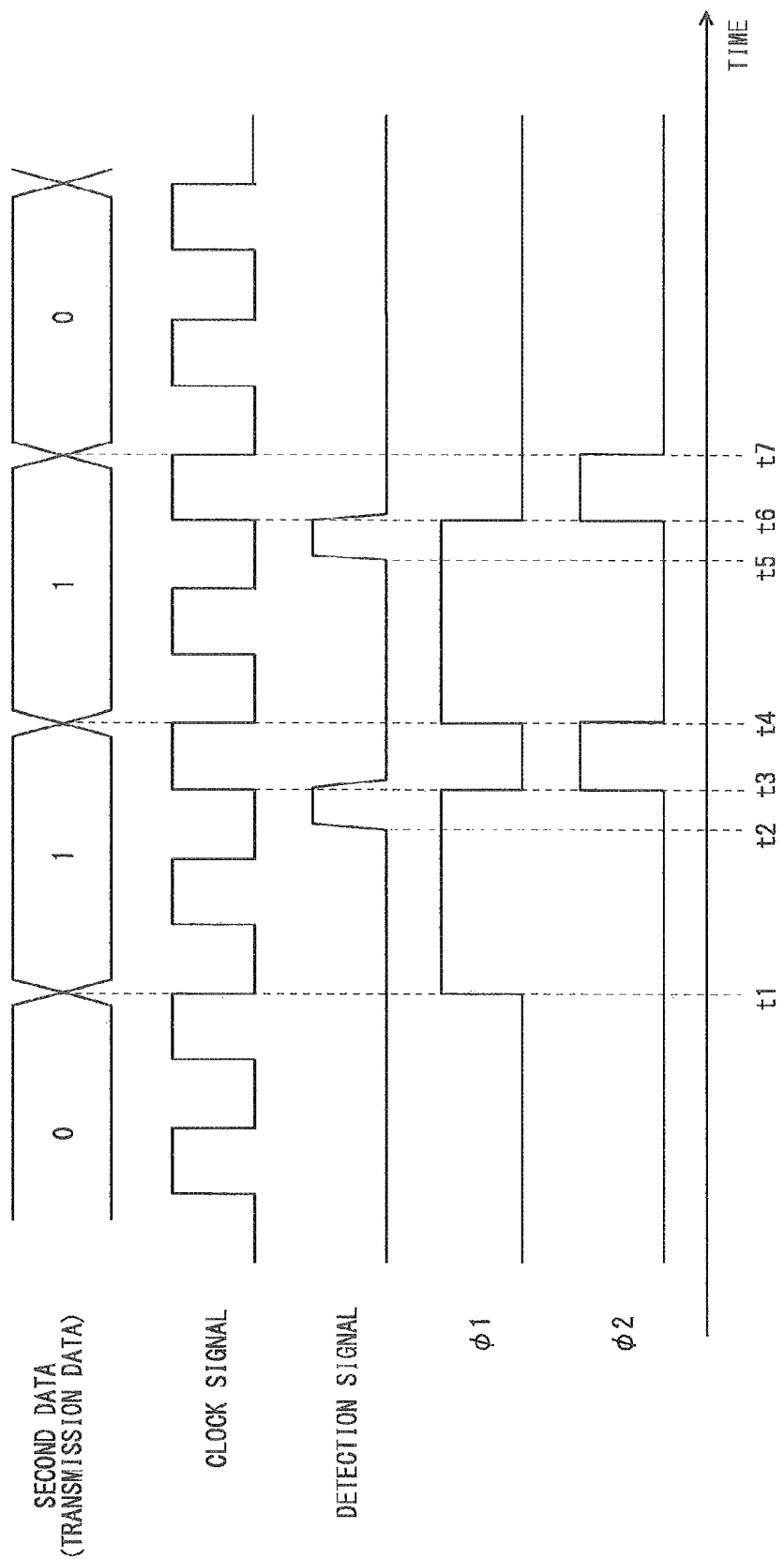
FIG. 29 is a timing chart for explaining an operation of the data transmitter used in the wireless communication system according to the eighth embodiment.

Next, an operation of the data transmitter 120 shall be explained using a timing chart shown in FIG. 29. As shown in FIG. 29, when the second data (the transmission data) 148 is "0", both of the control signals φ1 and φ2 become low levels. As the switches 135 to 137 are turned off, the power is not supplied to the input amplifier AMP5, the output amplifier AMP6, and the oscillator 123.

When the second data 148 becomes "1" at the timing t1, the control circuit 133 generates a high level signal as the control signal φ1. Then, the input node of the input amplifier AMP5 is connected to the antenna 121. Further, as the switch 135 is turned on, the power is supplied to the input amplifier AMP5 and the frequency comparator 126. Since the second data 148 is "1", the switch 137 is turned on, and the power is supplied to the oscillator 123.

The input amplifier AMP5 amplifies the signal 141 that corresponds to the first radio wave 14 (see FIG. 1) that is received by the antenna 121, and outputs the amplified signal 143 to the oscillator 123 and the frequency comparator 126. The control voltage generator 127 sweeps the control voltage 147, and changes the frequency of the output signal 144 from the oscillator 123. At this time, the frequency comparator 126 compares the frequency of the signal 143 output from the input amplifier AMP5 with the frequency of the signal 144 output from the oscillator 123.

When the frequency of the signal 143 matches the frequency of the signal 144 (at the timing t2), the frequency comparator 126 outputs a high level signal to the control circuit 133 and the control voltage generator 127 as the detection signal 145. When the high-level signal 145 is supplied to the control voltage generator 127, the control voltage 146 that is output to the oscillator 123 is fixed.

As the detection signal 145 is a high level, the control circuit 133 sets the control signal φ1 to a low level and the control signal φ2 to a high level at the timing t3 when the clock signal rises. Then, the output node of the output amplifier AMP6 is connected to the antenna 121. Further, as the switch 136 is turned on, the power is supplied to the output amplifier AMP6. Accordingly, the signal 142 that is amplified by the output amplifier AMP6 is transmitted from the antenna 121 as the second radio wave. That is, in the timing chart shown in FIG. 29, a period from the timings t1 to t3 is an input side path selection period (i.e., a period when the input amplifier AMP5 is turned on (a reception period)), and a period from timings t3 to t4 is an output side path selection period (i.e., a period when the output amplifier AMP6 is turned on (a transmission period)).

Since the second data 148 to be transmitted next is also "1", the control circuit 133 generates a high level signal as the control signal φ1 at the timing t4. At this time, the control signal φ2 becomes a low level. Subsequent operations are the same as the operations explained above, thus a repeated explanation shall be omitted. When the second data 148 becomes "0" at the timing t7, the control circuit 133 sets the control signals φ1 and φ2 to low levels.

Figure 30:
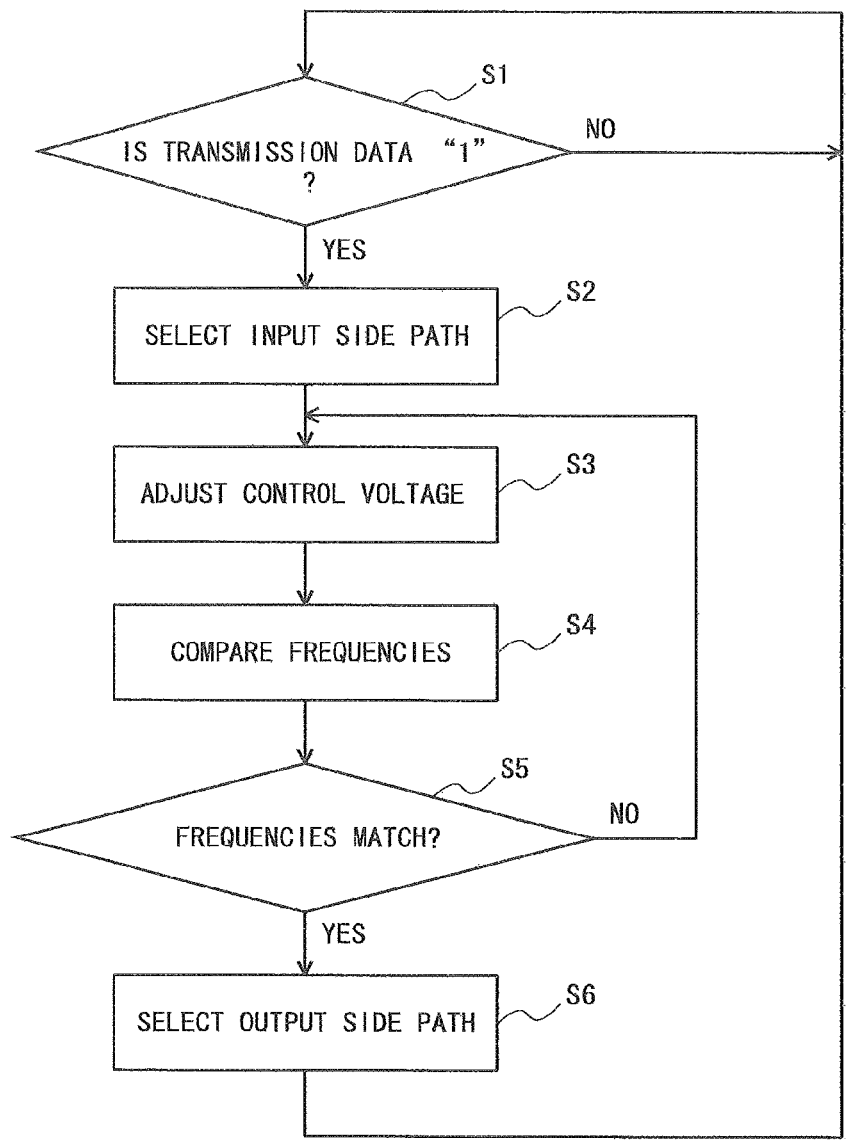
FIG. 30 is a flowchart for explaining the operation of the data transmitter used in the wireless communication system according to the eighth embodiment.

Next, an operation of the data transmitter 120 shall be explained using a flowchart shown in FIG. 30. The data transmitter 120 evaluates whether or not the second data (the transmission data) 148 that is output from the modulator 132 is "1" (Step S1). Then, when the second data 148 output from the modulator 132 is "1" (Step S1: Yes), a path on the input side of the input/output switching circuit 122 is selected (Step S2). That is, the input node of the input amplifier AMP5 is connected to the antenna 121. Next, the control voltage 146 to be supplied to the oscillator 123 is adjusted, and the frequency of the output signal 144 from the oscillator 123 is adjusted (Step S3).

After that, the frequency of the signal 143 output from the input amplifier AMP5 is compared with the frequency of the signal 144 that is output from the oscillator 123 (Step S4). When the frequency of the signal 143 and the frequency of the signal 144 do not match (Step S5: No), operations of Steps S3 and S4 are repeated. Alternatively, when the frequency of the signal 143 and the frequency of the signal 144 match (Step S5: Yes), the input/output switching circuit 122 is used to select a path on the output side (Step S6). That is, the output node of the output amplifier AMP6 is connected to the antenna 121. Thus, the signal 142 amplified by the output amplifier AMP6 is transmitted from the antenna 121 as the second radio wave. After that, by repeating the operations of Steps S1 to S6, the data transmitter 120 can transmit the second data (the transmission data) 148.

Note that, also in this embodiment, the second data transmitted by the data transmitter 120 is transmitted using a variation in the bit error rate of the radio waves (the first and second radio waves) that are received by the second radio equipment 20 (see FIG. 1).

In this embodiment, the input/output switching circuit 122 is provided in the data transmitter 120, and the path on the input side and the path on the output side are configured to allow switching between the path on the input side and the path on the output side in a time division manner. Thus, the antenna 121 can be shared between the path on the input side and the path on the output side, and the number of the antennas can be only one. It is thus possible to miniaturize the data transmitter 120.

That is, areas of the antennas occupy a large part of an area of a board on which the data transmitter is mounted. Therefore, as with the data transmitters explained in the first to seventh embodiments, when the antenna is provided for each of the path on the input side and the path on the output side, the number of the antennas will be two, and the area of the board on which the data transmitter is mounted tends to be large.

However, in this embodiment, as the antenna is shared between the path on the input side and the path on the output side, the number of the antennas can be reduced from two to one, and thus the data transmitter can be miniaturized.

Ninth Embodiment

Figure 31:
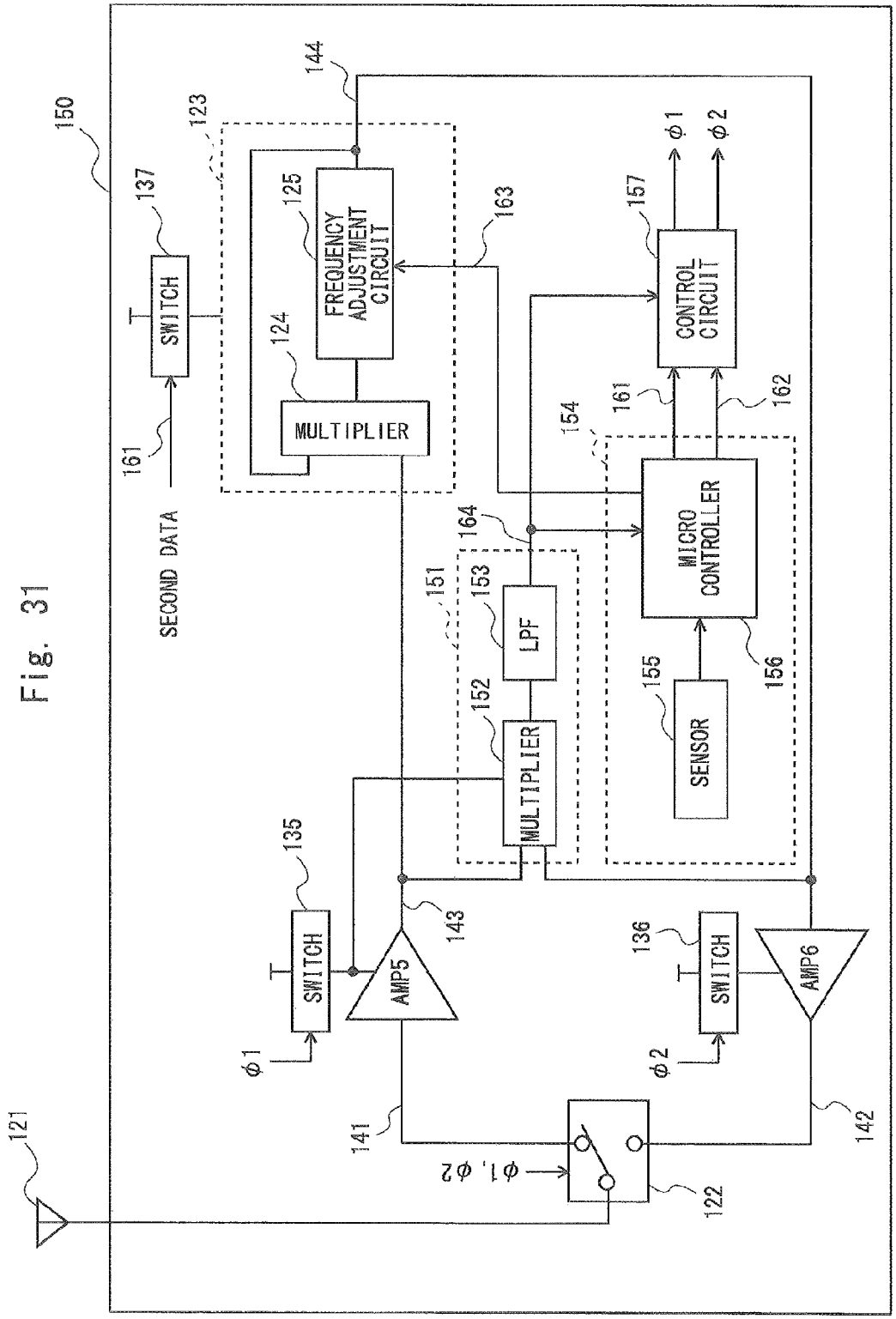
FIG. 31 is a block diagram showing a data transmitter used in a wireless communication system according to a ninth embodiment.

Next, a ninth embodiment shall be explained. FIG. 31 is a block diagram showing a data transmitter 150 used in a wireless communication system according to the ninth embodiment. As shown in FIG. 31, the data transmitter 150 includes the antenna 121, the input/output switching circuit 122, the input amplifier AMP5, the oscillator 123, the output amplifier AMP6, a frequency comparator 151, a modulator 154, a control circuit 157, and the switches 135 to 137.

In the data transmitter 150 used in this embodiment, configurations of the frequency comparator 151 and the modulator 154 are different from those in the data transmitter 120 explained in the eighth embodiment. As a configuration of the data transmitter 150 according to this embodiment other than the above-mentioned configuration is the same as the data transmitter explained in the eighth embodiment, the same components are denoted by the same reference numerals, and a repeated explanation shall be omitted.

The frequency comparator 151 includes a multiplier 152 and a low pass filter 153. The signal 143 output from the input amplifier AMP5 and the signal 144 output from the oscillator 123 are supplied to the multiplier 152. When the frequency of the signal 143 and the frequency of the signal 144 match, the multiplier 142 outputs a DC voltage to the low pass filter 153.

The low pass filter 153 removes an unnecessary frequency component from the DC voltage that is output from the multiplier 152, and outputs a DC voltage, the unnecessary frequency component of which has been removed, as the detection signal 164. The detection signal 164 output from the frequency comparator 151 is supplied to the microcontroller 156 and the control circuit 157 that are included in the modulator 154.

The modulator 154 includes a sensor 155 and the microcontroller 156. The sensor is, for example, a temperature sensor for measuring a body temperature of a human being and a pressure sensor for measuring blood pressure of a human being. Note that the sensor 155 is not limited to the temperature sensor or the pressure sensor, and any sensor may be used as long as it can acquire prescribed data.

The microcontroller 156 generates the second data (the transmission data) based on the data obtained by the sensor 155. The generated second data 161 is output to the control circuit 157 and the switch 137. Further, the microcontroller 156 generates a clock signal. A generated clock signal 162 is output to the control circuit 157.

The microcontroller 156 further generates a control voltage 163 for controlling the frequency adjustment circuit 125. For example, the microcontroller 156 may sweep the control voltage 163, change the frequency of the output signal 144 from the oscillator 123, and fix the control voltage 163 at the timing when the frequency of the output signal 144 from the oscillator 123 matches the frequency of the output signal 144 from the input amplifier AMP5. At this time, the microcontroller 156 can recognize the timing when the frequency of the output signal 144 from the oscillator 123 matches the frequency of the output signal 143 from the input amplifier AMP5 by the detection signal 164 that is supplied by the frequency comparator 151.

In this embodiment, the microcontroller 156 included in the modulator 154 functions as a modulator and also as the control voltage generator 127 and the clock generator 131 (see FIG. 28)

The control circuit 157 generates the control signals φ1 and φ2 for controlling the input/output switching circuit 122 and the switches 135 and 136 according to the detection signal 164, the second data 161, and the clock signal 162. Specifically, when the second data 161 to be transmitted is "1", the control circuit 157 generates a high level signal as the control signal φ1. Then, the input node of the input amplifier AMP5 is connected to the antenna 121. Moreover, as the switch 135 is turned on, the power is supplied to the input amplifier AMP5 and the multiplier 152. When the second data 161 to be transmitted is "1", the switch 137 is turned on, and thus the power is supplied to the oscillator 123.

After that, when the frequency of the output signal 144 from the oscillator 123 matches the frequency of the output signal 143 from the input amplifier AMP5, the detection signal 164 becomes a high level, and the control circuit 157 generates a low level signal as the control signal φ1 and a high level signal as the control signal φ2. Then, the output node of the output amplifier AMP6 is connected to the antenna 121. Further, as the switch 136 is turned on, the power is supplied to the output amplifier AMP6. At this time, as the switch 135 is turned off, the power is not supplied to the input amplifier AMP5 and the multiplier 152.

Figure 32:
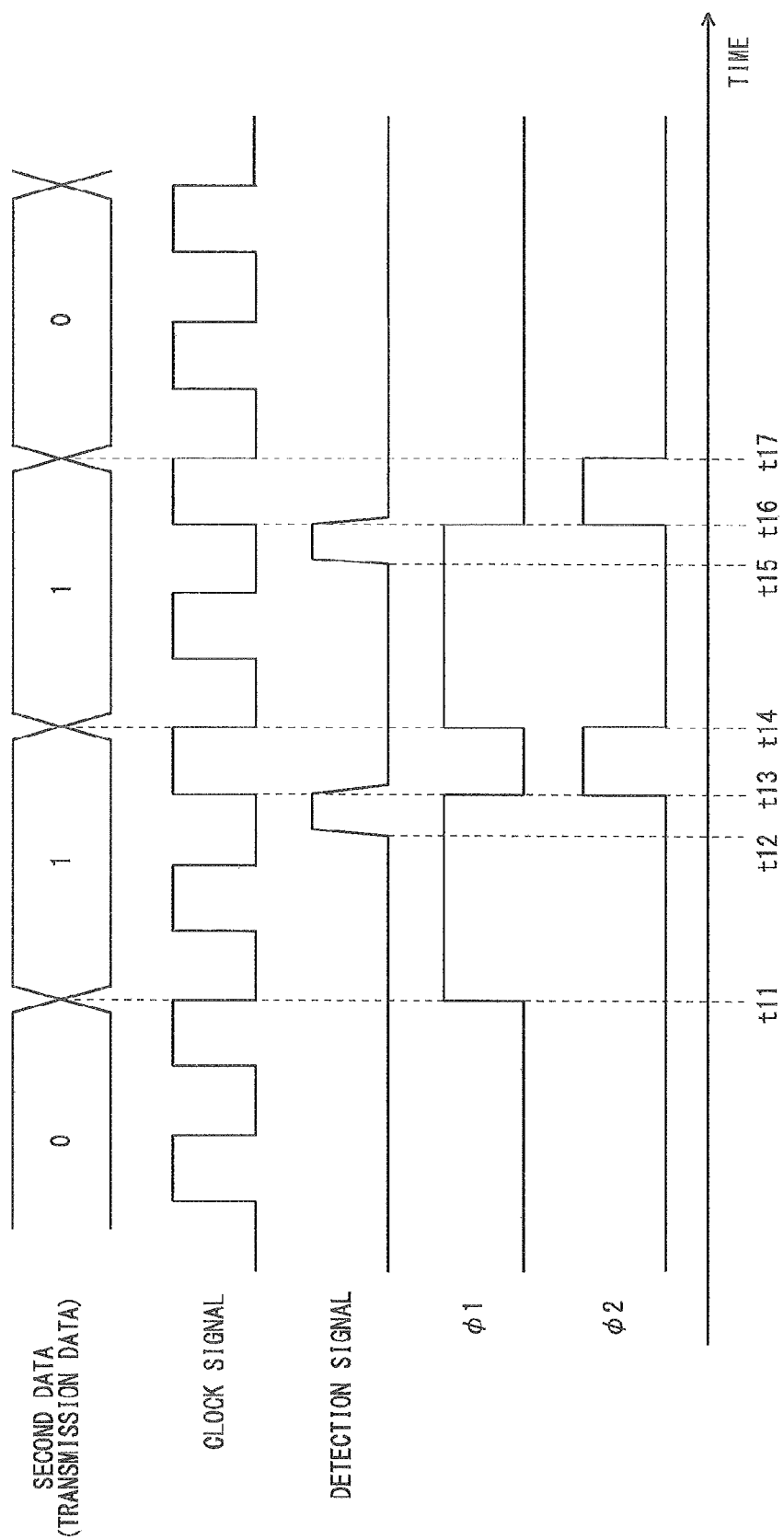
FIG. 32 is a timing chart for explaining an operation of the data transmitter used in the wireless communication system according to the ninth embodiment.

Next, an operation of the data transmitter 150 shall be explained using a timing chart shown in FIG. 32. As shown in FIG. 32, when the second data (the transmission data) 161 is "0", both of the control signals φ1 and φ2 become low levels. As the switches 135 to 137 are turned off, the power is not supplied to the input amplifier AMP5, the output amplifier AMP6, and the oscillator 123.

When the second data 161 becomes "1" at the timing t11, the control circuit 157 generates a high level signal as the control signal φ1. Then, the input node of the input amplifier AMP5 is connected to the antenna 121. Further, as the switch 135 is turned on, the power is supplied to the input amplifier AMP5 and the multiplier 152. Since the second data 161 is "1", the switch 137 is turned on, and the power is supplied to the oscillator 123.

The input amplifier AMP5 amplifies the signal 141 that corresponds to the first radio wave (see FIG. 1) that is received by the antenna 121, and outputs the amplified signal 143 to the oscillator 123 and the frequency comparator 151. The microcontroller 156 sweeps the control voltage 163, and changes the frequency of the output signal 144 from the oscillator 123. At this time, the frequency comparator 151 compares the frequency of the signal 143 that is output from the input amplifier AMP5 with the frequency of the signal 144 that is output from the oscillator 123.

When the frequency of the signal 143 matches the frequency of the signal 144 (at the timing t12), the multiplier 152 outputs a DC voltage to the low pass filter 153. The low pass filter 153 removes an unnecessary frequency component from the DC voltage that is output from the multiplier 152, and outputs a DC voltage, the unnecessary frequency component of which has been removed (i.e., outputs a high-level signal), as the detection signal 164. When the high-level detection signal 164 is supplied to the microcontroller 156, the microcontroller 156 fixes the control voltage 163 that is output to the oscillator 123.

As the detection signal 164 is a high level, the control circuit 133 sets the control signal φ1 to a low level and the control signal φ2 to a high level at the timing t13 when the clock signal 162 rises. Then, the output node of the output amplifier AMP6 is connected to the antenna 121. Further, as the switch 136 is turned on, the power is supplied to the output amplifier AMP6. Accordingly, the signal 142 that is amplified by the output amplifier AMP6 is transmitted from the antenna 121 as the second radio wave. That is, in the timing chart shown in FIG. 32, a period from the timings t11 to t13 is an input side path selection period (i.e., a period when the input amplifier AMP5 is turned on (a reception period)), and a period from timings t13 to t14 is an output side path selection period (i.e., a period when the output amplifier AMP6 is turned on (a transmission period)).

Since the second data 161 to be transmitted next is also "1", the control circuit 157 generates a high level signal as the control signal φ1 at the timing t14. At this time, the control signal φ2 becomes a low level. Subsequent operations are the same as the operations explained above, thus a repeated explanation shall be omitted. When the second data 161 becomes "0" at the timing t17, the control circuit 133 sets the control signals φ1 and φ2 to low levels.

Note that the operation of the data transmitter 150 illustrated using a flowchart is shown in FIG. 30. As FIG. 30 has already been explained, a repeated explanation shall be omitted.

In this embodiment, the input/output switching circuit 122 is provided in the data transmitter 150, and the path on the input side and the path on the output side are configured to allow switching between the path on the input side and the path on the output side in a time division manner. Thus, the antenna 121 can be shared between the path on the input side and the path on the output side, and the number of the antennas can be only one. It is thus possible to miniaturize the data transmitter 120.

Especially in this embodiment, the control voltage 163 for controlling the frequency adjustment circuit 125 and the clock signal 162 are generated using the microcontroller 156 included in the modulator 154. Therefore, the microcontroller 156 included in the modulator 154 can be effectively utilized. That is, the control voltage generator 127 and the clock generator 131 that are shown in FIG. 28 (the eighth embodiment) can be configured using the microcontroller 156.

Tenth Embodiment

Figure 33:
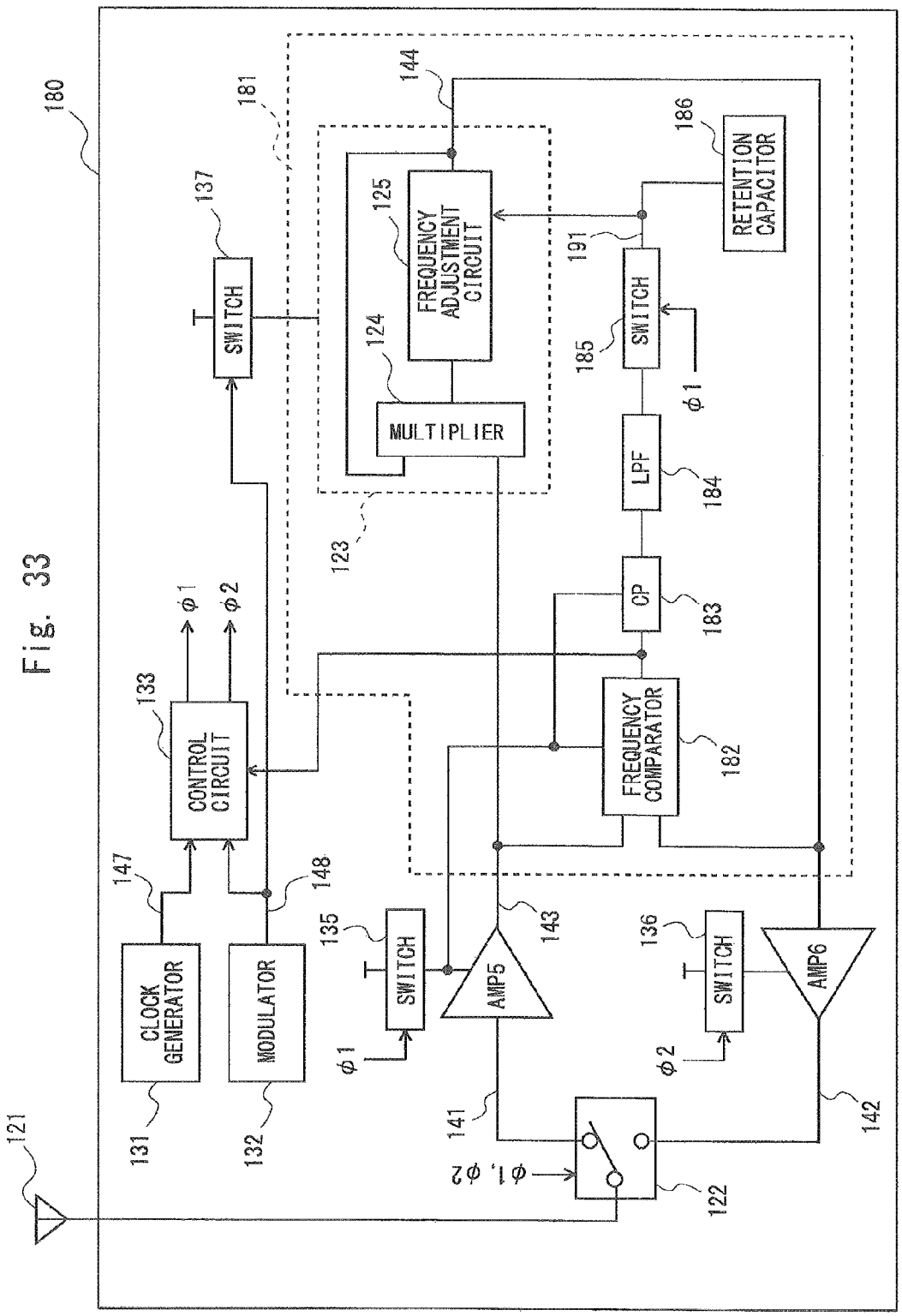
FIG. 33 is a block diagram showing a data transmitter used in a wireless communication system according to a tenth embodiment.

Next, a tenth embodiment shall be explained. FIG. 33 is a block diagram showing a data transmitter 180 used in a wireless communication system according to the tenth embodiment. The data transmitter 180 used in this embodiment is different from the data transmitter 120 explained in the eighth embodiment in that the data transmitter 180 according to this embodiment includes a PLL (Phase Locked Loop) circuit 181. As a configuration of the data transmitter 180 according to this embodiment other than the above-mentioned configuration is the same as the data transmitter explained in the eighth embodiment, the same components are denoted by the same reference numerals, and a repeated explanation shall be omitted.

As shown in FIG. 33, the data transmitter 180 includes the antenna 121, the input/output switching circuit 122, the input amplifier AMP5, the oscillator 123, the output amplifier AMP6, a frequency comparator 182, a charge pump circuit 183, a low pass filter 184, a switch 185, a retention capacitor 186, the clock generator 131, the modulator 132, the control circuit 133, and the switches 135 to 137. The oscillator 123 includes the multiplier 124 and the frequency adjustment circuit 125. Further, the frequency comparator 182, the charge pump circuit 183, the low-pass filter 184, the switch 185, the retention capacitor 186, and the oscillator 123 constitute the PLL circuit 181.

The frequency comparator 182 included in the PLL circuit 181 compares the frequency of the signal 143 that is output from the input amplifier AMP5 with the frequency of the signal 144 that is output from the oscillator 123, and outputs a result of the comparison to the control circuit 133 and the charge pump circuit 183. The charge pump circuit 183 generates a control voltage according to the result of the comparison between the signals 143 and 144 in the frequency comparator 182. The low pass filter 184 removes an unnecessary frequency component from the control voltage that is output from the charge pump circuit 183.

The switch 185 turns on and off the path of the control voltage output from the low pass filter 184, which is supplied to the frequency adjustment circuit 125 and the retention capacitor 186, according to the control signal φ1. Specifically, when the control signal φ1 is a high level, the switch 185 supplies the control voltage output from the low pass filter 184 to the frequency adjustment circuit 125 and the retention capacitor 186.

The frequency adjustment circuit 125 included in the oscillator 123 adjusts the frequency of the signal output from the multiplier 124 according to a control voltage 191. The PLL circuit 181 operates so that the frequency of the output signal 144 from the oscillator 123 (the frequency adjustment circuit 125) match the frequency of the output signal 143 from the input amplifier AMP5 (i.e., the PLL circuit 181 operates so as to generate injection locking). At this time, the retention capacitor 186 holds the control voltage 191 at a point when the frequency of the output signal 144 from the oscillator 123 matches the frequency of the output signal 143 from the input amplifier AMP5.

Next, an operation of the data transmitter 180 shall be explained using a timing chart shown in FIG. 34. As shown in FIG. 34, when the second data (the transmission data) 148 is "0", both of the control signals φ1 and φ2 become low levels. As the switches 135 to 137 are turned off, the power is not supplied to the input amplifier AMP5, the output amplifier AMP6, and the oscillator 123.

When the second data 148 becomes "1" at the timing t21, the control circuit 133 generates a high level signal as the control signal φ1. Then, the input node of the input amplifier AMP5 is connected to the antenna 121. Further, as the switch 135 is turned on, the power is supplied to the input amplifier AMP5, the frequency comparator 182, and the charge pump circuit 183. Since the second data 148 is "1", the switch 137 is turned on, and the power is supplied to the oscillator 123.

The input amplifier AMP5 amplifies the signal 141 that corresponds to the first radio wave 14 (see FIG. 1) that is received by the antenna 121. The PLL circuit 181 operates so that the frequency of the output signal 144 from the oscillator 123 matches the frequency of the output signal 143 from the input amplifier AMP5. At this time, a retention capacitor 186 holds a control voltage 191 at a point when the frequency of the output signal 144 from the oscillator 123 matches the frequency of the output signal 143 from the input amplifier AMP5 (the point is at the time of injection locking). The necessary lockup time of the PLL circuit 181 is sufficiently shorter than a clock cycle of the clock signal 147.

After the lockup of the PLL circuit 181, the control circuit 133 sets the control signal φ1 to a low level and the control signal φ2 to a high level at the timing t22. Then, the output node of the output amplifier AMP6 is connected to the antenna 121. Further, as the switch 136 is turned on, the power is supplied to the output amplifier AMP6. At this time, as the switch 185 is turned off, supply of the control voltage 191 to the frequency adjustment circuit 125 from the low pass filter 184 is blocked. However, as the control voltage at the time of injection locking is held in the retention capacitor 186, the control voltage 191 continues to be supplied to the frequency adjustment circuit 125 from the retention capacitor 186. Thus, the signal 142 that is amplified by the output amplifier AMP6 is transmitted from the antenna 121 as the second radio wave while holding the oscillation frequency in the injection locked state. That is, in the timing chart shown in FIG. 34, a period from the timings t21 to t22 is an input side path selection period (i.e., a period when the input amplifier AMP5 is turned on (a reception period)), and a period from timings t22 to t23 is an output side path selection period (i.e., a period when the output amplifier AMP6 is turned on (a transmission period)).

Since the second data 148 to be transmitted next is also "1", the control circuit 133 generates a high level signal as the control signal φ1 at the timing t23. At this time, the control signal φ2 becomes a low level. Subsequent operations are the same as the operations explained above, thus a repeated explanation shall be omitted. When the second data 148 becomes "0" at the timing t25, the control circuit 133 sets the control signals φ1 and φ2 to low levels.

Note that the operation of the data transmitter 180 illustrated using a flowchart is shown in FIG. 30. As FIG. 30 has already been explained, a repeated explanation shall be omitted.

Also in this embodiment, the input/output switching circuit 122 is provided in the data transmitter 180, and the path on the input side and the path on the output side are configured to allow switching between the path on the input side and the path on the output side in a time division manner. Thus, the antenna 121 can be shared between the path on the input side and the path on the output side, and the number of the antennas can be only one. It is thus possible to miniaturize the data transmitter.

In particular, as the data transmitter can be configured without using the microcontroller that is necessary in the ninth embodiment, the configuration of this embodiment is preferable for a data transmitter not using the microcontroller.

Next, a modified example of this embodiment shall be explained. In a timing chart shown in FIG. 34, switching between the input/output paths is performed only once within a symbol transmission period (t21 to t23). Thus, when the retention capacitor 186 leaks in the transmission period (t22 to t23), there may be an error in the control voltage 191 that is held in the retention capacitor 186. When an error is generated in the control voltage 191, an error is generated in the oscillation frequency of the oscillator 123. Thus, the communication sensitivity of the data transmitter 180 may deteriorate.

In order to solve such a problem, in the modified example of this embodiment, the connection between the input node of the input amplifier AMP5 and the antenna 121 and the connection between the output node of the output amplifier AMP6 and the antenna 121 are alternately repeated to thereby refresh the control voltage held in the retention capacitor 186.

FIG. 35 is a timing chart showing another example of the operation of the data transmitter 180 (a modified example of this embodiment). As shown in FIG. 35, when the second data (the transmission data) 148 is "0", both of the control signals φ1 and φ2 become low levels. As the switches 135 to 137 are turned off, the power is not supplied to the input amplifier AMP5, the output amplifier AMP6, and the oscillator 123.

When the second data 148 becomes "1" at the timing t31, the control circuit 133 generates a high level signal as the control signal φ1. Then, the input node of the input amplifier AMP5 is connected to the antenna 121. Further, as the switch 135 is turned on, the power is supplied to the input amplifier AMP5, the frequency comparator 182, and the charge pump circuit 183. Since the second data 148 is "1", the switch 137 is turned on, and the power is supplied to the oscillator 123.

The input amplifier AMP5 amplifies the signal 141 that corresponds to the first radio wave 14 (see FIG. 1) that is received by the antenna 121. The PLL circuit 181 operates so that the frequency of the output signal 144 from the oscillator 123 matches the frequency of the output signal 143 from the input amplifier AMP5. At this time, the retention capacitor 186 holds the control voltage 191 at a point when the frequency of the output signal 144 from the oscillator 123 matches the frequency of the output signal 143 from the input amplifier AMP5 (the point is at the time of injection locking). The time necessary for lockup of the PLL circuit 181 shall be shorter than a clock cycle of a clock signal (about several dozens of μsec).

The control circuit 133 sets the control signal φ1 to a low level and the control signal φ2 to a high level at the timing t32. Then, the output node of the output amplifier AMP6 is connected to the antenna 121. Further, as the switch 136 is turned on, the power is supplied to the output amplifier AMP6. At this time, the control voltage 191 continues to be supplied to the frequency adjustment circuit 125 from the retention capacitor 186. Thus, the signal 142 amplified by the output amplifier AMP6 is transmitted from the antenna 121 as the second radio wave while holding the oscillation frequency in the injection locked state.

Additionally, in the modified example of this embodiment, as the control signals φ1 and φ2 are alternately switched at a high speed while the second data is "1" (in a period from the timing t31 to t33), the connection between the input node of the input amplifier AMP5 and the antenna 121 and the connection between the output node of the output amplifier AMP6 and the antenna 121 are alternately repeated. By such an operation, it is possible to refresh the control voltage held in the retention capacitor 186. That is, every time the control signal φ1 becomes a high level, the control voltage held in the retention capacitor 186 can be refreshed.

In the modified example of this embodiment, as the control voltage held in the retention capacitor 186 is refreshed, the error in the control voltage 191 held in the retention capacitor 186 can be reduced, thereby improving the communication sensitivity of the data transmitter.

Note that the above-described first to tenth embodiments can be combined as appropriate.

The wireless communication system and the data transmitter according to the embodiments can be described as, but not limited to, the following supplementary notes.

(Supplementary Note 1)

A wireless communication system comprising:
a first radio equipment that transmits first data using a first radio wave;
a data transmitter that transmits a second radio wave, the second radio wave causing a disturbance on the first radio wave according to second data to be transmitted; and a second radio equipment that demodulates the first data transmitted from the first radio equipment, and demodulates the second data transmitted from the data transmitter using a variation in a bit error rate of communication between the first radio equipment and the second radio equipment, wherein
the data transmitter includes:
an antenna that receives the first radio wave, and transmits the second radio wave;
an input amplifier that amplifies a signal corresponding to the first radio wave received by the antenna;
an oscillator that is supplied with an output from the input amplifier, and oscillates at the same frequency as that of the first radio wave;
an output amplifier that amplifies a signal output from the oscillator;
an input/output switching circuit that switches between a connection that is between an input node of the input amplifier and the antenna and a connection that is between an output node of the output amplifier and the antenna; and
a control circuit that controls the input/output switching circuit, and
when the second data is transmitted, the control circuit connects the input node of the input amplifier to the antenna, and after a frequency of an output signal from the oscillator matches a frequency of an output signal from the input amplifier, the control circuit connects the output node of the output amplifier to the antenna.

(Supplementary Note 2)

2. The wireless communication system according to Supplementary note 1, wherein
the oscillator includes a frequency adjustment circuit that performs adjustment so that the frequency of the output signal from the oscillator matches the frequency of the output signal from the input amplifier.

(Supplementary Note 3)

3. The wireless communication system according to Supplementary note 2, wherein
the data transmitter further includes a control voltage generator that generates a control voltage of the frequency adjustment circuit,
the control voltage generation circuit
sweeps the control voltage and changes the frequency of the output signal from the oscillator, and fixes the control voltage at a timing when the frequency of the output signal from the oscillator matches the frequency of the output signal from the input amplifier.

(Supplementary Note 4)

The wireless communication system according to Supplementary note 1, wherein the control circuit is further configured to control power supply to the input amplifier and the output amplifier, the control circuit supplies the power to the input amplifier while the input node of the input amplifier is connected to the antenna, and the control circuit supplies the power to the output amplifier while the output node of the output amplifier is connected to the antenna.

(Supplementary Note 5)

The wireless communication system according to Supplementary note 1, wherein the data transmitter turns on and off power supplied to the oscillator according to the second data.

(Supplementary Note 6)

The wireless communication system according to Supplementary note 1, wherein the data transmitter further includes a frequency comparator that compares the frequency of the output signal from the input amplifier with the frequency of the output signal from the oscillator, the frequency comparator includes:

a multiplier that is supplied with the output signal from the input amplifier and the output signal from the oscillator, and outputs a DC voltage when the frequency of the output signal from the input amplifier matches the frequency of the output signal from the oscillator; and a low pass filter that removes an unnecessary frequency component from the DC voltage output from the multiplier.

(Supplementary Note 7)

The wireless communication system according to Supplementary note 1, wherein the data transmitter includes a PLL circuit including the oscillator, and the PLL circuit operates so that the frequency of the output signal from the oscillator matches the frequency of the output signal from the input amplifier.

(Supplementary Note 8)

The wireless communication system according to Supplementary note 7, wherein the PLL circuit includes a retention capacitor that holds a control voltage for controlling a frequency of the oscillator.

(Supplementary Note 9)

The wireless communication system according to Supplementary note 8, wherein while transmitting the second data, the data transmitter alternately repeats a connection between the input node of the input amplifier and the antenna and a connection between the output node of the output amplifier and the antenna to thereby refresh the control voltage held in the retention capacitor.

(Supplementary Note 10)

A data transmitter comprising:

an antenna that receives a first radio wave and transmits a second radio wave, the first radio wave being used in a wireless network, and the second radio wave causing a disturbance on the first radio wave according to second data to be transmitted;

an input amplifier that amplifies a signal corresponding to the first radio wave received by the antenna;

an oscillator that is supplied with an output from the input amplifier, and oscillates at the same frequency as that of the first radio wave;

an output amplifier that amplifies a signal output from the oscillator;

an input/output switching circuit that switches between a connection that is between an input node of the input amplifier and the antenna and a connection that is between an output node of the output amplifier and the antenna; and a control circuit that controls the input/output switching circuit, wherein when the second data is transmitted, the control circuit connects the input node of the input amplifier to the antenna, and after a frequency of an output signal from the oscillator matches a frequency of an output signal from the input amplifier, the control circuit connects the output node of the output amplifier to the antenna.

Although the present invention made by the present inventor has been explained in detail based on the embodiments, it is obvious that the present invention is not limited to the above embodiments, and various modifications can be made in a range not departing from the scope of the invention.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A wireless communication system comprising:

a first radio equipment that transmits first data using a first radio wave;

a data transmitter that transmits a second radio wave, the second radio wave causing a disturbance on the first radio wave according to second data to be transmitted; and a second radio equipment that demodulates the first data transmitted from the first radio equipment, and demodulates the second data transmitted from the data transmitter using a variation in a bit error rate of communication between the first radio equipment and the second radio equipment, wherein the data transmitter includes:

a first antenna that receives the first radio wave;

an input amplifier that amplifies a signal corresponding to the first radio wave received by the first antenna;

an oscillator that is supplied with an output from the input amplifier, and oscillates at the same frequency as that of the first radio wave;

an output amplifier that amplifies a signal output from the oscillator; and a modulator that modulates a signal output from the output amplifier according to the second data; and a second antenna that transmits the modulated signal as the second radio wave.

2. The wireless communication system according to claim 1, further comprising a feedback element that feedbacks a signal from the second antenna side to the first antenna side, and forms a feedback loop.

3. The wireless communication system according to claim 2, wherein the feedback element is configured using the first and second antennas, and the feedback loop is formed by transmitting a third radio wave from the second antenna to the first antenna.

4. The wireless communication system according to claim 1, wherein
the modulator modulates the signal output from the output amplifier by turning on and off power supplied to the output amplifier according to the second data.

5. The wireless communication system according to claim 1, wherein
the first radio equipment transmits a predetermined data pattern as the first data, and
the second radio equipment uses an expected value of the predetermined data pattern for calculating the bit error rate of communication between the first radio equipment and the second radio equipment.

6. The wireless communication system according to claim 1, wherein
the modulator modulates the second radio wave transmitted from the second antenna by turning on and off power supplied to the input amplifier, the oscillator, and the output amplifier according to the second data.

* * * * *